United States Patent
Bonica et al.

(10) Patent No.: US 11,412,071 B2
(45) Date of Patent: Aug. 9, 2022

(54) COMPRESSED ROUTING HEADER INFORMATION FOR NETWORKS

(71) Applicant: Juniper Networks, Inc., Sunnyvale, CA (US)

(72) Inventors: Ronald Bonica, Sterling, VA (US); Parag Kaneriya, Bangalore (IN); Shraddha Hegde, Ka (IN); Rajesh Shetty Manur, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/448,985

(22) Filed: Jun. 21, 2019

(65) Prior Publication Data
US 2020/0366763 A1    Nov. 19, 2020

Related U.S. Application Data

(60) Provisional application No. 62/847,046, filed on May 13, 2019.

(51) Int. Cl.
*H04L 69/04*         (2022.01)
*H04L 45/741*        (2022.01)
(Continued)

(52) U.S. Cl.
CPC .......... *H04L 69/04* (2013.01); *H04L 45/741* (2013.01); *H04L 61/2507* (2013.01); *H04L 61/6059* (2013.01); *H04L 69/22* (2013.01)

(58) Field of Classification Search
CPC ... H04L 69/04; H04L 45/741; H04L 61/2507; H04L 61/6059; H04L 69/22
See application file for complete search history.

(56) References Cited

U.S. PATENT DOCUMENTS 9,722,878 B2   8/2017  Filsfils et al.
9,838,311 B2   12/2017 Ashwood-Smith
(Continued)

FOREIGN PATENT DOCUMENTS

CN    105052090 A    11/2015
CN    106411738 A    2/2017
(Continued)

OTHER PUBLICATIONS

C. Filsfils, et al., "Segment Routing with MPLS data plane", https://tools.ietf.org/id/draft-ietf-spring-segment-routing-mpls-18.txt, Dec. 9, 2018, 32 pages.
(Continued)

*Primary Examiner* — William G Trost, IV
*Assistant Examiner* — Monishwar Mohan
(74) *Attorney, Agent, or Firm* — Harrity & Harrity, LLP

(57) ABSTRACT

A node may receive a network topology message that identifies a first association of a first segment identifier (SID), relating to a loosely routed segment of a network, and an address of a first terminal interface associated with the loosely routed segment, or a second association of a second SID, relating to a strictly routed segment of the network, and an address of a second terminal interface associated with the strictly routed segment. The node may generate an entry in a segment translation table based on the first association or the second association. The node may route, according to the segment translation table, an internet protocol (IP) payload packet that has been encapsulated using an IPv6 transport header that has been extended with a compressed routing header of variable length.

20 Claims, 15 Drawing Sheets

(51) Int. Cl.
*H04L 61/2503* (2022.01)
*H04L 101/659* (2022.01)
*H04L 69/22* (2022.01)

(56) References Cited

U.S. PATENT DOCUMENTS

| | | | |
|---|---|---|---|
| 10,135,734 B1 | 11/2018 | Singh et al. | |
| 10,419,982 B1 | 9/2019 | Gundavelli et al. | |
| 2005/0129023 A1* | 6/2005 | Jagannathan | H04L 69/161 370/392 |
| 2014/0269422 A1* | 9/2014 | Filsfils | H04L 49/608 370/254 |
| 2014/0369356 A1* | 12/2014 | Bryant | H04L 45/12 370/392 |
| 2015/0109902 A1* | 4/2015 | Kumar | H04L 41/0668 370/219 |
| 2015/0256456 A1* | 9/2015 | Previdi | H04L 45/745 370/392 |
| 2016/0173366 A1 | 6/2016 | Saad et al. | |
| 2017/0250907 A1 | 8/2017 | Pignataro et al. | |
| 2017/0257684 A1 | 9/2017 | Anand et al. | |
| 2017/0346737 A1 | 11/2017 | Previdi et al. | |
| 2018/0034727 A1 | 2/2018 | Nainar et al. | |
| 2018/0083871 A1* | 3/2018 | Filsfils | H04L 45/50 |
| 2018/0198705 A1 | 7/2018 | Wang et al. | |
| 2018/0375766 A1 | 12/2018 | Filsfils et al. | |
| 2018/0375968 A1* | 12/2018 | Bashandy | H04L 12/4633 |
| 2019/0036818 A1 | 1/2019 | Nainar et al. | |
| 2019/0104058 A1 | 4/2019 | Filsfils et al. | |
| 2019/0149449 A1 | 5/2019 | Morris | |
| 2019/0190818 A1* | 6/2019 | Ceccarelli | H04L 45/56 |
| 2019/0215267 A1 | 7/2019 | Filsfils et al. | |
| 2019/0260657 A1 | 8/2019 | Filsfils et al. | |
| 2019/0273813 A1 | 9/2019 | Mirsky | |
| 2019/0288873 A1 | 9/2019 | Camarillo Garvia et al. | |
| 2019/0288940 A1 | 9/2019 | Filsfils et al. | |
| 2019/0394211 A1 | 12/2019 | Filsfils et al. | |
| 2020/0099610 A1* | 3/2020 | Heron | H04L 45/34 |
| 2020/0128469 A1 | 4/2020 | Akhavain Mohammadi | |
| 2020/0153732 A1* | 5/2020 | Negi | H04L 47/34 |
| 2020/0322261 A1* | 10/2020 | Hu | H04L 45/22 |
| 2020/0358698 A1 | 11/2020 | Song et al. | |
| 2021/0176169 A1* | 6/2021 | Chen | H04L 45/22 |

FOREIGN PATENT DOCUMENTS

| | | |
|---|---|---|
| CN | 107113204 A | 8/2017 |
| CN | 107342939 A | 11/2017 |
| CN | 107566272 A | 1/2018 |
| CN | 108156077 A | 6/2018 |
| CN | 109067652 A | 12/2018 |
| EP | 3739823 A1 | 11/2020 |

OTHER PUBLICATIONS

C. Filsfils, et al., "IPv6 Segment Routing Header (SRH)", https://tools.ietf.org/id/draft-ietf-6man-segment-routing-header-18.txt, Apr. 5, 2019, 26 pages.
R. Bonica, et al., "The IPv6 Compressed Routing Header (CRH)", https://tools.ietf.org/id/draft-bonica-6man-comp-rtg-hdr-03.txt, Mar. 23, 2019, 14 pages.
S. Previdi, et al., "IS-IS Extensions for Segment Routing", https://tools.ietf.org/id/draft-ietf-isis-segment-routing-extensions-24.txt, Apr. 17, 2019, 28 pages.
P. Psenak, et al., "IS-IS Extensions to Support Routing over IPv6 Dataplane", https://tools.ietf.org/id/draft-bashandy-isis-srv6-extensions-05.txt, Mar. 6, 2019, 19 pages.
Extended European Search Report for Application No. EP19200194.9, dated Jan. 24, 2020, 12 pages.
Filsfils C., et al., "Segment Routing Architecture; rfc8402.txt", Internet Engineering Task Force (IETF), Internet Society (ISOC) 4, Jul. 25, 2018, pp. 1-32, XP015126362, [Retrieved on Jul. 25, 2018].
Extended European Search Report for Application No. EP19181594.3, dated Dec. 20, 2019, 10 pages.
Filsfils C., et al., "IPv6 Segment Routing Header (SRH); draft-ietf-6man-segment-routing-header-15.txt", Internet Engineering Task Force (IETF), Internet Society (ISOC), No. 15, Oct. 22, 2018, pp. 1-28, XP015129321.
Mirsky G., et al., "Unified Identifier in IPv6 Segment Routing Networks draft-mirsky-6man-unified-id-sr-01," https://tools.ietf.org/pdf/draft-mirsky-6man-unified-id-sr-01.pdf, Oct. 10, 2018, 7 pages.
Lebrun., "Implementing IPv6 Segment Routing in the Linux Kernel," IEE, 2016. 7 pages.
Co-pending U.S. Appl. No. 16/236,216, inventor Bonica; Ronald, filed Dec. 28, 2018.
Filsfils C., et al., "Internet Engineering Task Force (IETF) Segment Routing Architecture," Jul. 2018, pp. 1-32, XP055718271, [retrieved on Jul. 27, 2020] Retrieved from the Internet [URL: https://tools.ietf.org/pdf/rfc8402.pdf].

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     Type      |    Length     |     Flags     |     Weight    |
+-+-+-+-+-+-+-+-+-+-+-+-+-+-+-+-+-+-+-+-+-+-+-+-+-+-+-+-+-+-+-+-+
|              Neighbor System-ID (ID length octets)            |
+-+-+-+-+-+-+-+-+-+-+-+-+-+-+-+-+-+-+-+-+-+-+-+-+-+-+-+-+-+-+-+-+
|                                                               |
+-+-+-+-+-+-+-+-+-+-+-+-+-+-+-+-+-+-+-+-+-+-+-+-+-+-+-+-+-+-+-+-+
|                              SID                              |
+-+-+-+-+-+-+-+-+-+-+-+-+-+-+-+-+-+-+-+-+-+-+-+-+-+-+-+-+-+-+-+-+
                                340
```

FIG. 3D

COMPRESSED ROUTING HEADER INFORMATION FOR NETWORKS

RELATED APPLICATION

This application claims priority under 35 U.S.C. § 119 to U.S. Provisional Patent Application No. 62/847,046 ("COMPRESSED ROUTING HEADER INFORMATION FOR NETWORKS"), filed on May 13, 2019, the content of which is incorporated by reference herein in its entirety.

BACKGROUND

An internet protocol (IP) source node, such as an IPv6 node, can steer a payload packet through a specific path to a destination. For example, the source node may define the path as an ordered list of segments and may encode the path in an IPv6 routing header.

SUMMARY

According to some implementations, a method may include receiving, by a node, a first network topology message relating to a loosely routed segment of a network, wherein the first network topology message associates a first segment identifier (SID) with an address of a first terminal interface associated with the loosely routed segment; generating, by the node, a first entry in a segment translation table that associates the first SID with the address of the first terminal interface associated with the loosely routed segment; receiving, by the node, a second network topology message relating to a strictly routed segment of the network, wherein the second network topology message associates a second SID and an address of a second terminal interface associated with the strictly routed segment; generating, by the node, a second entry in the segment translation table that associates the second SID with the address of the second terminal interface associated with the strictly routed segment; receiving, by the node, an IP payload packet that has been encapsulated using an IPv6 transport header that has been extended with a compressed routing header (CRH) of variable length, wherein the CRH includes a list of SIDs that identify a set of nodes that the IP payload packet is to traverse while being routed through the network; determining, by the node and by referencing the list of SIDs, a next SID for the IP payload packet, wherein the next SID is associated with one of the first terminal interface or the second terminal interface; identifying, by the node and based on the segment translation table, an address associated with the next SID; and routing, by the node, the IP payload packet to the first terminal interface or the second terminal interface based on the address associated with the next SID.

According to some implementations, a node may include one or more memories and one or more processors to receive a first network topology message relating to a loosely routed segment of a network, wherein the first network topology message associates a first SID with an address of a first terminal interface associated with the loosely routed segment; generate a first entry in a segment translation table that associates the first SID with the address of the first terminal interface associated with the loosely routed segment; receive a second network topology message relating to a strictly routed segment of the network, wherein the second network topology message associates a second SID and an address of a second terminal interface associated with the strictly routed segment; and generate a second entry in the segment translation table that associates the second SID with the address of the second terminal interface associated with the strictly routed segment, wherein the segment translation table is to be used to route an IP payload packet that has been encapsulated using an IPv6 transport header that has been extended with a CRH of variable length, wherein the CRH includes a list of SIDs that identify a set of nodes that the IP payload packet is to traverse while being routed through the network.

According to some implementations, a non-transitory computer-readable medium may store one or more instructions that, when executed by one or more processors of a node, may cause the one or more processors to receive a network topology message that identifies one of a first association of a first SID, relating to a loosely routed segment of a network, and an address of a first terminal interface associated with the loosely routed segment, or a second association of a second SID, relating to a strictly routed segment of the network, and an address of a second terminal interface associated with the strictly routed segment; generate an entry in a segment translation table based on the first association identified in the network topology message or the second association identified in the network topology message; and route, according to the segment translation table, an IP payload packet that has been encapsulated using an IPv6 transport header that has been extended with a CRH of variable length, wherein the CRH includes a list of SIDs that identify a set of nodes that the IP payload packet is to traverse while being routed through the network.

BRIEF DESCRIPTION OF THE DRAWINGS

FIGS. 3A-3D are diagrams of example type-length-value (TLV) elements.

DETAILED DESCRIPTION

Figure 1A:
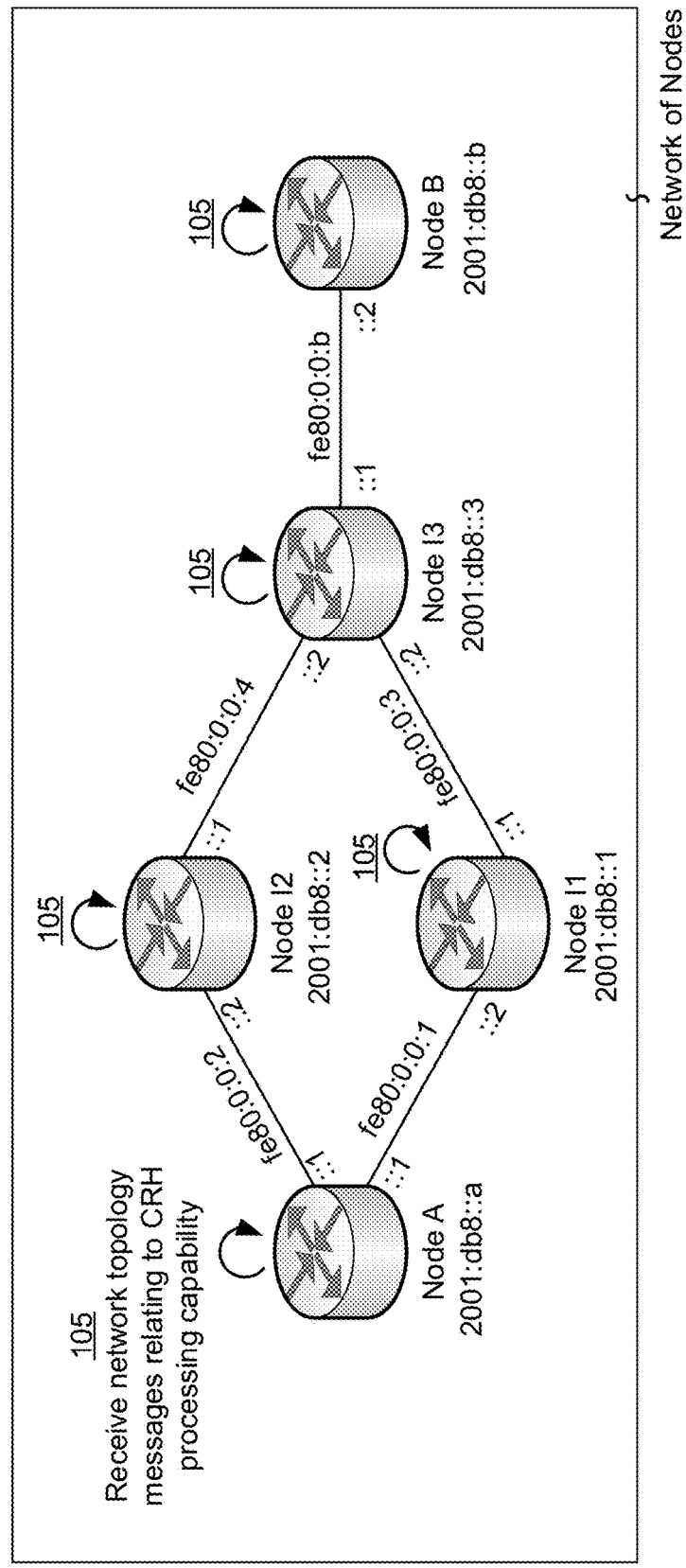
FIGS. 1A-1E are diagrams of one or more example implementations described herein.

The following detailed description of example implementations refers to the accompanying drawings. The same reference numbers in different drawings may identify the same or similar elements.

A network of nodes may be used to route packets. In many cases, the packets may be routed through the network by taking a least cost path. For example, a packet may have multiple possible paths through the network, and the nodes may use a routing protocol (e.g., Intermediate System to Intermediate System (IS-IS), or the like) to select a least cost path through the network route.

In some situations, segment routing may be used to allow the packets to be routed using a path other than a least cost path. For example, a client using the network to route packets may want the packets to travel through a particular firewall, to avoid network congestion by taking a longer path through the network, and/or the like. To route a packet through the network using segment routing, the packet may be encapsulated using a segment routing header that includes a list of IP addresses (or segment identifiers with bit-lengths as long as IP addresses) that serve as required hops that the packet is to take while being routed through the network. As an example, when a node in the network receives a packet, the node may, instead of identifying a next hop in a least cost path, process the list of IP addresses in the segment routing header to determine whether a next hop is a required hop identified in the list.

However, segment routing is often an inefficient way to route packets through a network. For example, many nodes used to route packets through the network may have application-specific integrated circuits (ASICs) that copy the entire list of IP addresses from buffer memory to on-chip memory. If the list of IP addresses is long, the nodes may expend significant processing resources performing copying operations and/or significant memory resources storing the list.

Some implementations described herein provide a network of nodes that use a CRH to route (e.g., according to an IS-IS routing protocol) an encapsulated IP payload packet through a network using a pre-defined path, where the CRH includes a list of SIDs that have variable lengths between eight bits and sixty-four bits. For example, the set of nodes may each be configured with particular segment translation tables that define one or more segments of the pre-defined path. The segment translation table may include strictly routed segments and/or loosely routed segments, as will be described further herein.

A node may generate and/or update a segment translation table according to one or more network topology messages (e.g., a network topology message that includes one or more TLV elements). A network topology message may indicate whether a node supports CRH. Further, a network topology message may indicate whether a particular segment associated with the node is loosely routed or strictly routed. A node may use the segment translation table for packet routing.

In practice, when a first edge node receives an IP payload packet, the first edge node may encapsulate the IP payload packet using an IPv6 transport header that has been extended to include the CRH. Additionally, the first edge node may provide the IP payload packet to a first intermediary node in the network.

In this case, the first intermediary node may reference the list of SIDs included in the CRH to select a SID. Additionally, the first intermediary node may reference the segment translation table to identify a corresponding SID that is stored in association with an IP address and/or interface of a next-hop node for the IP payload packet. In this case, the first intermediary node may update a destination IP address (e.g., which may be included in the IPv6 transport header) to the IP address of the next-hop node. Additionally, the first intermediary node may update a remaining segments value of the CRH by decrementing the value by one.

Furthermore, the first intermediary node may provide the IP payload packet to the next-hop node (e.g., another intermediary node, an endpoint node, and/or the like) to allow the next-hop node to continue to route the IP payload packet. One or more additional nodes in the network may use the list of SIDs to route the IP payload packet until the IP payload packet is received by the endpoint node. When the endpoint node receives the IP payload packet, the IP payload packet may have a remaining segments value of zero. This may allow the endpoint node to process a payload header of the IP payload packet (rather than the IPv6 transport header that is extended with the CRH) to identify a final destination IP address of a final destination (e.g., a device outside of the network) and to send the IP payload packet to the final destination.

In this way, the set of nodes are able to use the CRH to route the IP payload packet through the network in a manner that uses a pre-defined path, without needing to include IP addresses for each hop in the CRH. By using smaller values in the list of SIDs (instead of a list of IP addresses), the set of nodes conserve resources (e.g., processing resources, network resources, memory resources, and/or the like) relative to other types of segment routing headers. For example, use of the CRH conserves processing resources that the set of nodes would otherwise expend performing copy operations on a longer, more conventional segment routing header, conserves network resources by reducing a total length of the IP payload packet that is being transmitted over the network (relative to a conventional segment routing header), conserves memory resources by reducing an amount of memory needed to store the IP payload packet (relative to a conventional segment routing header), and/or the like.

Furthermore, some implementations described herein allow the IP payload packet to be routed through one or more strictly routed segments (defined further herein) using one or more link-local IPv6 addresses. For example, for all segments except a final segment, a node that receives the IP payload packet may update the destination IP address to a link-local IPv6 address. This improves security by reducing chances of the IP payload packet being routed off one of the strictly routed segments. Additionally, by updating the destination IP address to a global IP address on a final segment (rather than to a link-local IPv6 address), the set of nodes further improves security by providing protection against link-local address spoofing.

In addition, because of efficiencies associated with CRH, the set of nodes may generate and/or update segment translation tables based on a minimum set of network topology messages. In this way, the set of nodes conserve resources (e.g., processing resources, network resources, memory resources, and/or the like) relative to other techniques (e.g., multiprotocol label switching (MPLS) segment routing or IPv6 segment routing using segment routing headers) that require numerous network topology messages in order to generate and/or update segment translation tables.

FIGS. 1A-1E are diagrams of one or more example implementations 100 described herein. For example, example implementation(s) 100 may include a first peer device (shown as Peer Device (PD) 1 in FIG. 1E), a second peer device (shown as PD 2), and a set of nodes that are part of a network, such as a first edge node (shown as Node A), a set of intermediary nodes (shown as Node I1, Node I2, and Node I3), and a second edge node (shown as Node B). As shown in FIGS. 1A-1E, the network of nodes may be configured with particular segment translation tables and may use the particular segment translation tables to route, through the network, an IP payload packet that has been encapsulated using an IPv6 transport header that has been extended with a CRH.

The network of nodes may route the packets according to an IS-IS routing protocol. The IS-IS routing protocol is a link-state routing protocol, whereby nodes of the network of nodes flood link state information throughout the network of nodes (e.g., so that all links of the network of nodes are advertised). For example, the nodes may transmit network topology messages (e.g., network topology messages including one or more TLV elements) to advertise link state information. The network topology messages may be transmitted at regular intervals (e.g., every minute, every hour, every day, and/or the like) and/or at irregular intervals (e.g., upon introduction of a new node, restarting a node, resetting a node, updating a node, and/or the like).

As shown by FIG. 1A, and by reference number 105, the nodes of a network of nodes (e.g., a network of nodes associated with an IS-IS routing protocol) may receive network topology messages (e.g., advertisement messages, control messages, and/or the like) relating to CRH processing capability. In some implementations, an indication of CRH processing capability may be provided in a CRH capability field of the network topology message. In such a case, the CRH capability field may be a child field associated with a parent field of the network topology message. For example, the network topology message may include a TLV element relating to a capability of the node (e.g., a router CAPABILITY TLV as defined in Internet Engineering Task Force (IETF) Request for Comments (RFC) 7981, or the like) and the indication of CRH processing capability may be provided in a sub-TLV element (e.g., as described below in connection with FIG. 3A) of the TLV element.

In some implementations, a node may transmit a network topology message (e.g., including a CRH capability field) indicating that the node is capable of processing a CRH, and the remaining nodes may receive the network topology message. In this way, the network topology message indicates to the remaining nodes that an IP payload packet with a CRH may be routed to the node.

In some implementations, the nodes of a network of nodes (e.g., a network of nodes associated with an IS-IS routing protocol) may receive network topology messages (e.g., advertisement messages, control messages, and/or the like) relating to supported segment routing algorithms. For example, a node, such as a node capable of processing a CRH, may transmit a network topology message indicating one or more segment routing algorithms that the node supports.

Figure 1B:
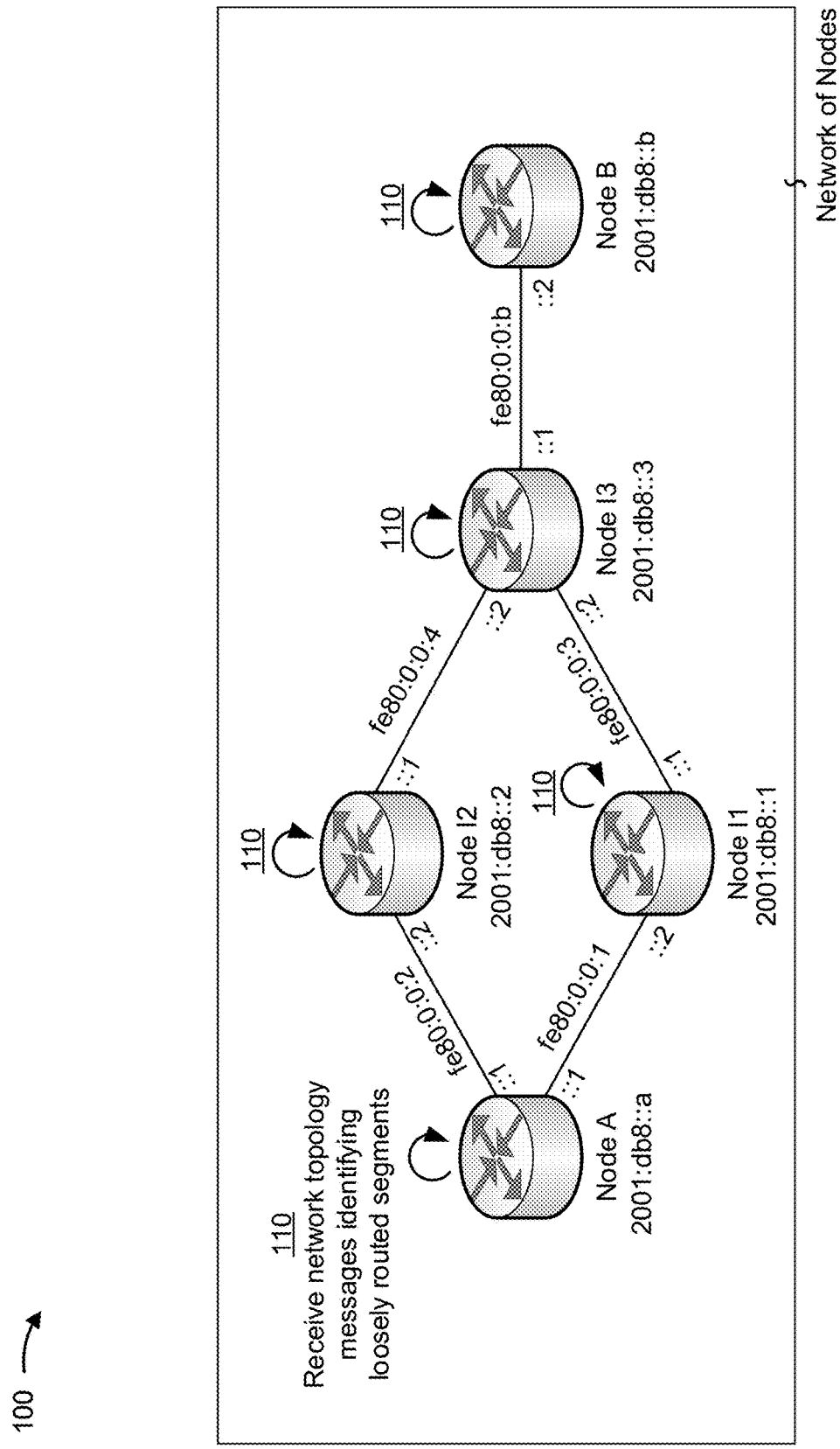

As shown in FIG. 1B, and by reference number 110, the nodes of a network of nodes (e.g., a network of nodes associated with an IS-IS routing protocol) may receive network topology messages (e.g., advertisement messages, control messages, and/or the like) identifying loosely routed segments of the network of nodes. A loosely routed segment may be defined as a path from a node to a terminal interface, where the node and the terminal interface are connected via one or more other nodes and/or links.

In some implementations, an identification of a loosely routed segment may be provided in a loosely routed segment field of the network topology message. In such a case, the loosely routed segment field may be a child field associated with a parent field of the network topology message. For example, the network topology message may include a TLV element relating to a network reachability (e.g., an IPv6 Reachability TLV as defined in IETF RFC 5308, a Multi-Topology Reachable IPv6 Prefixes TLV as defined in IETF RFC 5120, and/or the like) and the identification of the loosely routed segment may be provided in a sub-TLV element (e.g., as described below in connection with FIG. 3B) of the TLV element.

In some implementations, a node may transmit a network topology message (e.g., including a loosely routed segment field) that identifies a SID of a loosely routed segment, and the remaining nodes may receive the network topology message. For example, the SID may be identified in a child field of the network topology message. In such a case, the child field may be associated with a parent field that identifies an IP address (e.g., a global IP address) that can be used to identify the node. In this way, the network topology message permits the remaining nodes to associate the SID with the IP address.

Figure 1C:
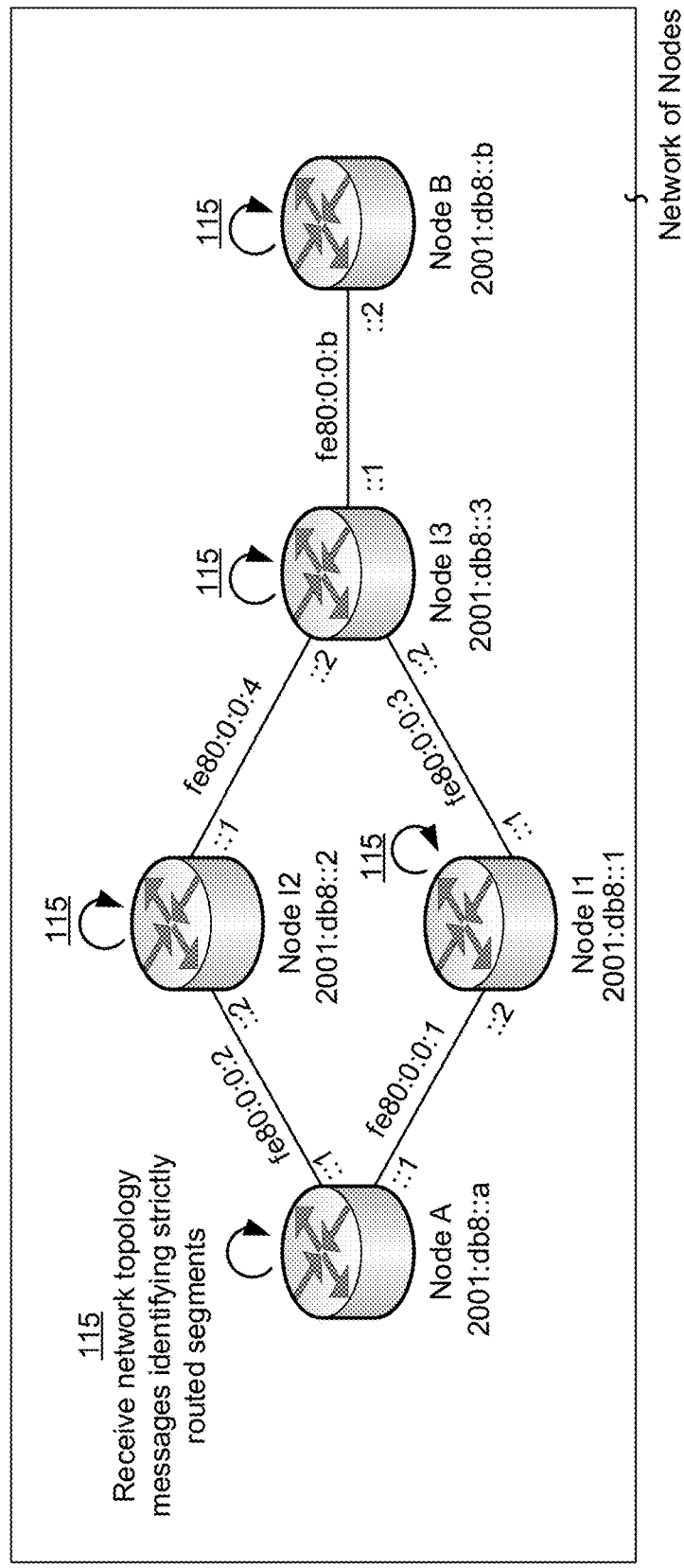

As shown in FIG. 1C, and by reference number 115, the nodes of a network of nodes (e.g., a network of nodes associated with an IS-IS routing protocol) may receive network topology messages (e.g., advertisement messages, control messages, and/or the like) identifying strictly routed segments of the network of nodes. A strictly routed segment may be defined as a path from a node to a terminal interface, where there is exactly one link from the node to the terminal interface.

In some implementations, an identification of a strictly routed segment may be provided in a strictly routed segment field of the network topology message. In such a case, the strictly routed segment field may be a child field associated with a parent field of the network topology message. For example, the network topology message may include a TLV element relating to a neighbor node (e.g., an Extended Intermediate Systems Reachability TLV as defined in IETF 5305, a Multi-topology Intermediate System TLV as defined in IETF RFC 5120, an Intermediate System Neighbor Attribute TLV as defined in IETF RFC 5311, a Multi-topology Intermediate System Neighbor Attribute TLV as defined in IETF RFC 5311, an Inter-Autonomous System Reachability TLV as defined in IETF RFC 5316, and/or the like) and the identification of the strictly routed segment may be provided in a sub-TLV element (e.g., as described below in connection with FIG. 3C) of the TLV element.

The network topology message also may be used to identify strictly routed segments of a local area network (LAN). In a LAN subnetwork, a designated intermediate system (DIS) is responsible for originating a pseudonode link-state packet that includes all neighbors of the DIS. Furthermore, each node of the LAN subnetwork provides a network topology message identifying only one adjacency to the DIS. Thus, the network topology message may include a strictly routed segment field associated with a parent field of the network topology message. For example, the network topology message may include a TLV element relating to a neighbor node (e.g., an Extended Intermediate Systems Reachability TLV as defined in IETF 5305, a Multi-topology Intermediate System TLV as defined in IETF RFC 5120, an Intermediate System Neighbor Attribute TLV as defined in IETF RFC 5311, a Multi-topology Intermediate System Neighbor Attribute TLV as defined in IETF RFC 5311, and/or the like) and the identification of the strictly routed segment may be provided in a sub-TLV element (e.g., as described below in connection with FIG. 3D) of the TLV element.

In some implementations, a node may transmit a network topology message (e.g., including a strictly routed segment field) that identifies a SID of a strictly routed segment, and the remaining nodes may receive the network topology message. For example, the SID may be identified in a child field of the network topology message. In such a case, the child field may be associated with a parent field of the network topology message and the parent field may include one or more additional child fields relating to an address of a neighbor node (e.g., an IPv6 Neighbor Address sub-TLV as defined in IETF RFC 6119). The parent field and/or the one or more additional child fields (i.e., siblings to the strictly routed segment field) may identify a global IP address and/or a link-local IP address that can be used to identify the neighbor node (e.g., an interface at which the strictly routed segment terminates) and a link that connects the node to the neighbor node. In this way, the network topology message permits the remaining nodes to associate the SID with the global IP address, the link-local IP address, and/or the link.

Figure 1D:
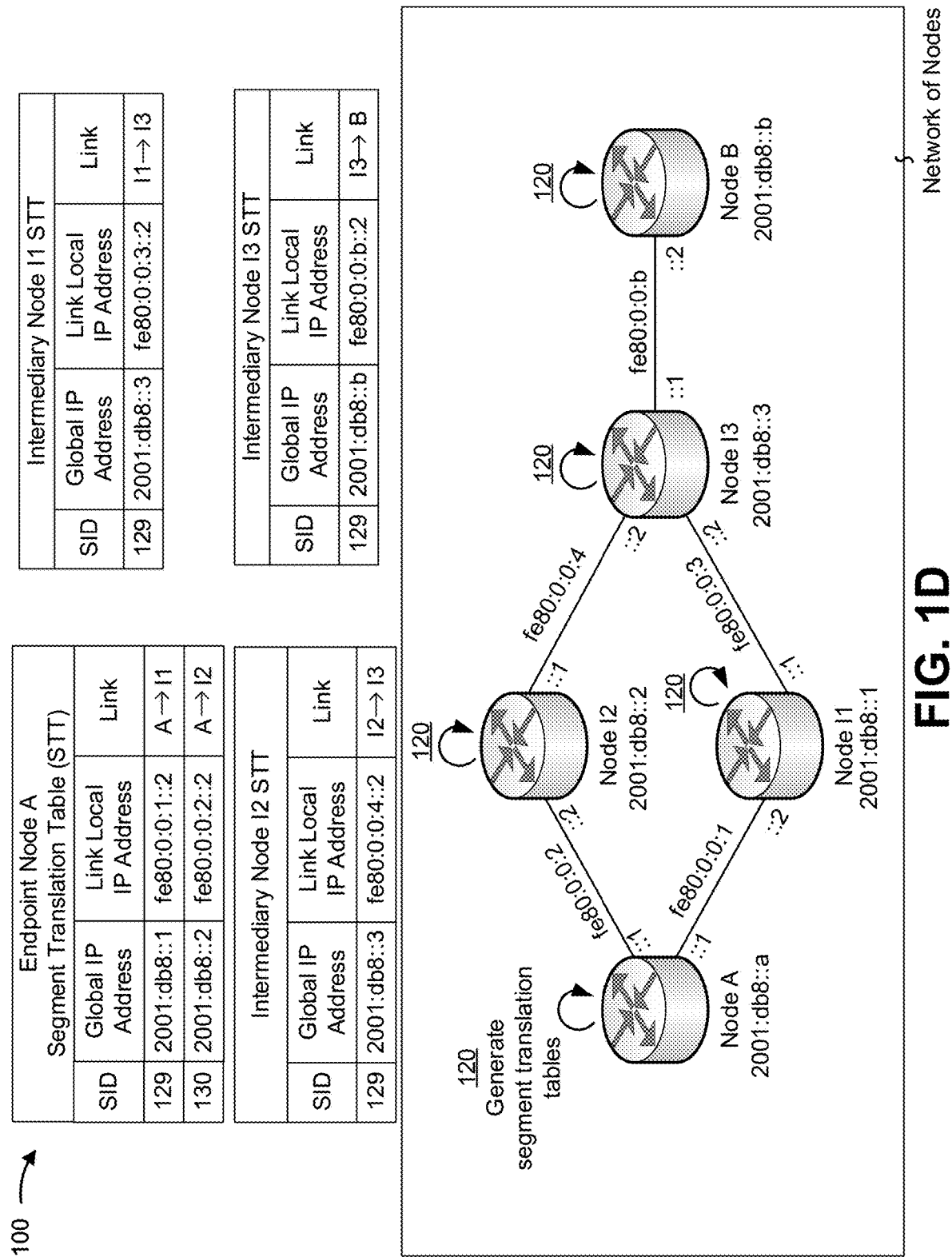

As shown in FIG. 1D, and by reference number 120, the nodes of a network of nodes (e.g., a network of nodes associated with an IS-IS routing protocol) may generate and/or update segment translation tables (e.g., forwarding information bases). That is, each node of the network of nodes may generate and/or update a segment translation table. For example, a node may generate and/or update a segment translation table based on one or more network topology messages, as described above. The segment translation table may assist the node in routing network traffic via a specific path according to one or more SIDs. A SID may be represented by a value that is less expensive for nodes to copy than an IP address (e.g., an eight-bit value, a 16-bit value, and/or the like), thereby reducing network congestion and conserving computing resources (e.g., processor resources, memory resources, and/or the like).

The segment translation table may include values that define one or more segments of a path that an IP payload packet could take through the network of nodes. For example, the segment translation table may include one or more strictly routed segments, one or more loosely routed segments, and/or a combination of strictly and loosely routed segments.

In some implementations, a node of the network of nodes may generate and/or update a segment translation table that includes a set of loosely routed segments. For example, the node may generate and/or update the segment translation table based on a network topology message transmitted by another node of the network of nodes. As described above, the network topology message may include a loosely routed segment field identifying a SID associated with the other node (e.g., a SID that is unique to the network of nodes). Based on the network topology message, the node may determine an IP address that is to be associated with the SID (e.g., based on a parent field to the loosely routed segment field). Thus, the segment translation table may include, for each loosely routed segment, a SID and an IP address (e.g., an IPv6 address) that can be used to identify a terminal interface. The IP address may be a global IP address (e.g., a globally scoped address, a unique local address (ULA), and/or the like).

Additionally, or alternatively, a node of the network of nodes may generate and/or update a segment translation table that includes a set of strictly routed segments. For example, the node may generate and/or update the segment translation table based on a network topology message transmitted by another node of the network of nodes. As described above, the network topology message may include a strictly routed segment field identifying a SID associated with the other node (e.g., a SID that is unique to the node). Based on the network topology message, the node may determine an IP address (e.g., a global IP address and/or a link-local IP address) and/or a link that is to be associated with the SID (e.g., based on a parent field and/or a sibling field to the strictly routed segment field). Thus, the segment translation table may include, for each strictly routed segment, a SID, one or more IP addresses (e.g., a global IP address, a link-local IP address, and/or the like) that can be used to identify an interface at which the strictly routed segment terminates (i.e., a terminal interface), and a link that connects the node to the terminal interface. The interface at which a strictly routed segment terminates is the global IP address (e.g., a globally-scoped IP address, a ULA, and/or the like) or the link-local IPv6 address. The link-local IPv6 address may be used when sending IP payload packets to intermediary nodes, and the global IP address may be used when sending IP payload packets to an edge node (e.g., an egress node).

An example of a segment translation table that includes strictly routed segments is shown in FIG. 1D. As shown in FIG. 1D, a first strictly routed segment may include a SID of 129, a global IP address of 2001:db8::1, a link-local IPv6 address of fe80:0:0:1::2, and an interface from the first edge node to the first intermediary node (shown as A→I1). A second strictly routed segment may include a SID of 130, a global IP address of 2001:db8::2, a link-local IPv6 address of fe80:0:0:2::2, and an interface from the first edge node to the second intermediary node (shown as A→I2). In some cases, an ingress node (e.g., the first edge node) may include a master list of segments for the entire route of the IP payload packet (e.g., which are shown in FIG. 1D as being part of segment translation tables for other nodes).

Figure 1E:
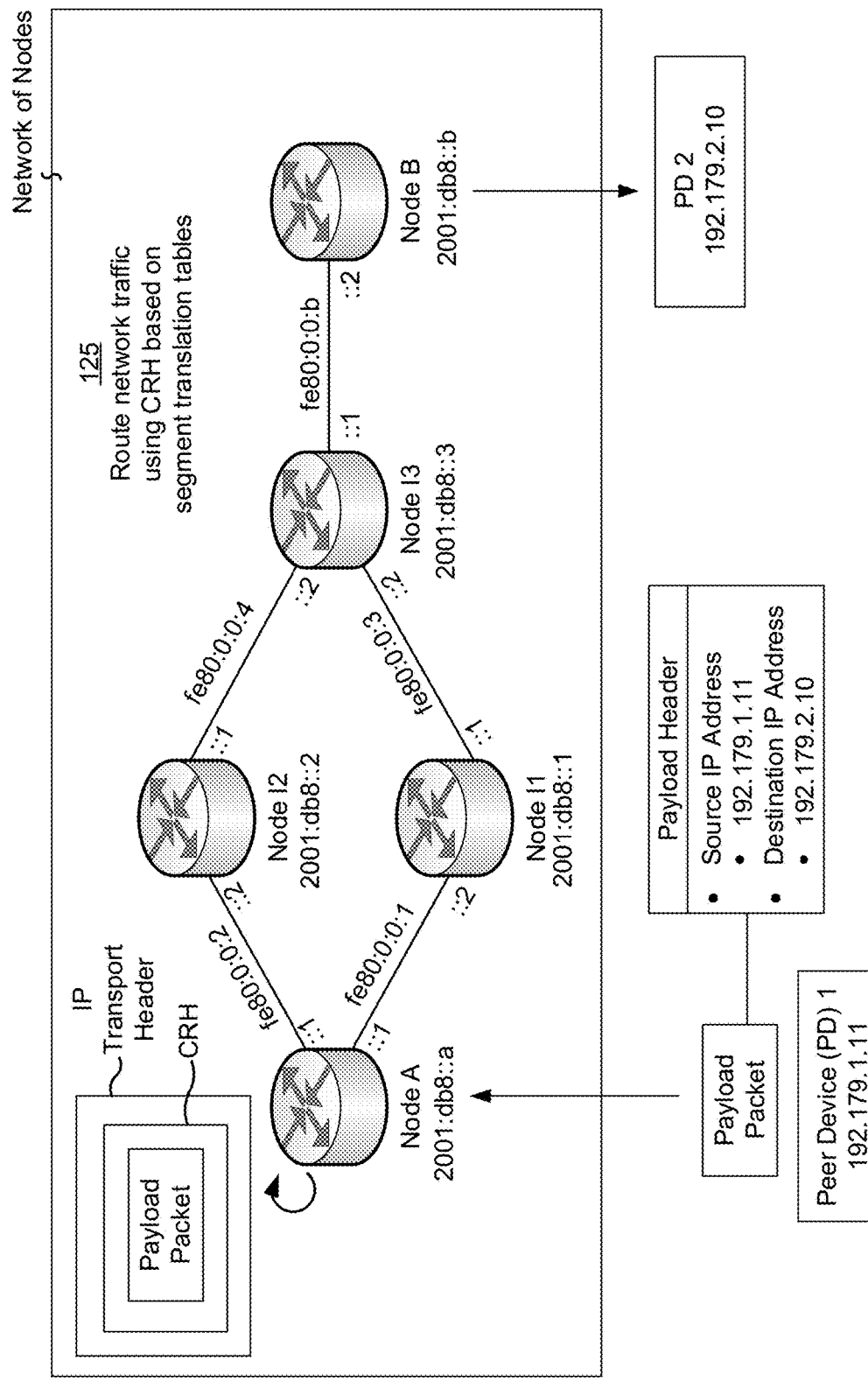

As shown in FIG. 1E, and by reference number 125, the nodes of a network of nodes may route network traffic using CRH based on the segment translation tables. In such a case, the first edge node may be configured with route instructions. For example, the first edge node may be configured with route instructions that specify a particular path that certain IP payload packets are to take through the network, that identify one or more required hops that certain IP payload packets are to take through the network, and/or the like. In this case, the first edge node may be configured with route instructions that have been provided by a network controller, by a device associated with a network administrator, by a device of a client that has explicitly requested that certain IP payload packets be subject to the route instructions, and/or the like. The route instructions may be applicable to all IP payload packets, to a specific type of IP payload packets, to IP payload packets with a particular source IP address and/or destination IP address, and/or the like.

The first peer device may provide an IP payload packet to the first edge node. For example, the first peer device may encapsulate an IP payload packet with a payload header. The payload header may be an IPv4 payload header, an IPv6 payload header, an ethernet payload header, or the like. The payload header may include a source IP address of the first peer device (shown as 192.179.1.11) and a destination IP address of the second peer device (shown as 192.179.2.10).

The first edge node may encapsulate the IP payload packet using an IPv6 transport header that has been extended using a CRH. For example, the first edge node may reference the segment translation table and/or the route instructions to determine that the IP payload packet is to be encapsulated using an IPv6 transport header that has been extended with a CRH (e.g., based on information relating to CRH capability included in the segment translation table). As an example, the route instructions may indicate that IP payload packets with a particular source IP address or destination IP address are to be encapsulated with an IPv6 transport header that is extended with a CRH.

The CRH may include a list of SIDs that define the path for the IP payload packet, a total segments value, a remaining segments value, a compression value, a next header value, a header extension length, a routing type, and a reserved value. The list of SIDs may include a list of node-specific values that correspond to a list of SIDs included in the segment translation table. The total segments value may identify a maximum quantity of segments needed for the IP payload packet to reach a final-hop node (e.g., the second edge device). The remaining segments value may identify a quantity of remaining segments between an origin node (e.g., the node that receives the IP payload packet) and the second edge node. A description of the remaining values of the CRH may be found below in relation to FIG. 2.

In some implementations, before determining which values to include in the CRH, the first edge node may update the source IP address and the destination IP address included in the IPv6 transport header. For example, the first edge node may update the source IP address with the global IP address of the first edge node, and may update the destination IP address with the link-local IPv6 address of the next-hop node (which may be found in the segment translation table).

In some implementations, the first edge node may select which values to include in the CRH. For example, the first edge node may select, as values for the list of SIDs, the values that are identified in the segment translation table. Additionally, the first edge node may determine a total segments value based on a quantity of entries in the list of SIDs. One or more additional values in the CRH may be selected or generated in a manner described elsewhere herein.

In some implementations, the first edge node may encapsulate the IP payload packet using the IPv6 transport header that has been extended with the CRH. For example, the first edge node may encapsulate the IP payload packet such that the IPv6 transport header is an outer-most header of the IP payload packet. Between the IP payload packet and the IPv6 transport header may be a set of extension headers (e.g., a hop-by-hop extension header, a routing extension header, a destination header, and/or the like) which are not part of the processes described herein.

The first edge node may provide the IP payload packet that has been encapsulated to an intermediary node specified in the list of SIDs (e.g., the first intermediary node). In this way, the first edge node is able to encapsulate the IP payload packet using the IPv6 transport header that has been extended with the CRH and is able to use values included in the CRH to route the IP payload packet to the next-hop in the network.

The intermediary node may perform one or more header pre-processing checks and/or one or more security checks on the IP payload packet. For example, the intermediary node may determine whether the destination IP address that is included in the IPv6 transport header matches an IP address of the intermediary node. This is because the set of nodes are configured to process, update, and/or modify the CRH only if the destination IP address that is included in the IPv6 transport header matches an IP address of a node. In this example, the intermediary node may determine that the destination IP address matches the IP address of the intermediary node (e.g., the IPv6 transport header may have a destination IP address of fe80:0:0:1::2, which is the link-local IPv6 address of the first intermediary node).

The intermediary node may determine a quantity of remaining segments in a path of the IP payload packet. For example, the intermediary node may process the remaining segments value of the CRH to determine the quantity of remaining segments in the path. If the remaining segments value is greater than zero, then the intermediary node may continue processing the CRH. If the remaining segments value is zero, then the intermediary node may stop processing the CRH and process a next header of the IP payload packet (e.g., one of the extension headers, the payload header, and/or the like). In practice, the remaining segments value will be zero only when a final node in the network is receiving the IP payload packet. This provides the final node with a way to identify when the IP payload packet has reached a final hop in the network and may cause the final node to forgo processing of the CRH and to route the IP payload packet to a device outside of the network, as will be described further herein.

The intermediary node may perform one or more security checks. For example, the intermediary node may determine whether the source IP address included in the IPv6 transport header is a link-local IPv6 address, may determine whether the source IP address or destination IP address included in the IPv6 transport header is a multicast address, may determine whether a hop limit has been exceeded, may determine whether the IP payload packet is malformed, and/or the like.

The intermediary node may determine a next segment for the IP payload packet. For example, the intermediary node may determine an index i for the next segment by subtracting a remaining segments value from a total segments value. Additionally, the intermediary node may identify a SID number at index position i in the list of SIDs. This allows the intermediary node to determine the next segment by searching the segment translation table for a corresponding SID that may be stored in association with a global IP address of a next-hop node, a link-local IPv6 address of a next-hop node, and a link identifier of a link to the next-hop node.

The intermediary node may update the destination IP address of the IP payload packet and the remaining segments value. For example, the intermediary node may translate the destination IP address with a global IP address or a link-local IPv6 address of the next-hop node. In this case, the intermediary node may translate the destination IP address with the global IP address if the remaining segments value is one (or another value that indicates that a next segment is a final segment) or may replace the destination IP address with the link-local IPv6 address if the remaining segments value is greater than one (or another value that indicates that the next segment is not the final segment). In some cases, the intermediary node may translate an 8-bit, 16-bit, 32-bit, or 64-bit segment identifier, to a 128-bit IPv6 address.

In some implementations, the intermediary node may update the remaining segments value. For example, the intermediary node may decrement the remaining segments value by one. In this way, the intermediary node is able to use the CRH to determine the next segment for the IP payload packet and is able to update one or more values of the IP payload packet that allow subsequent nodes to continue to route the IP payload packet.

The intermediary node may provide the IP payload packet that has been encapsulated to a further intermediary node (e.g., a next-hop intermediary node specified in the list of SIDs). The IPv6 transport header of the IP payload packet may include a source IP address of the first endpoint node and a destination IP address that is a link-local IPv6 address of the further intermediary node. The further intermediary node may perform processing of the CRH in a manner similar to that described above in connection with the intermediary node.

After processing of the CRH by one or more intermediary nodes (e.g., to forward the IP payload packet that has been encapsulated according to the path defined for the IP payload packet), an intermediary node may provide the IP payload packet that has been encapsulated to the second edge node (Node B). The IP payload packet may include a source IP address of the first edge node (2001: db8::a) and a destination IP address of the second edge node (2001: db8::b). In some implementations, the second edge node may perform one or more header pre-processing checks, in a manner described elsewhere herein.

The second edge node may determine a next-hop for the IP payload packet based on the quantity of remaining segments. For example, the second edge node may process the CRH to determine that the remaining segments value is equal to zero.

In some implementations, because the remaining segments value is zero, the second edge node may forgo additional processing of the CRH and may process one more other headers of the IP payload packet (e.g., the payload header, or the like). In the example shown, the payload header may include a destination IP address for the second peer device (192.179.2.10), which may allow the second edge device to route the IP payload packet to the second peer device.

The second edge node may determine a next-hop by referencing a segment translation table. The second edge node may be configured with a segment translation table that has the destination IP address of the second peer device stored as part of the translation table (e.g., in place of the global IP address, and with a null value for a link-link-local IPv6 address), and may reference the segment translation table to identify the destination IP address of the second peer device.

In this way, the set of nodes are able to use the CRH to route the IP payload packet through the network in a manner that uses a strictly defined path, without needing to include IP addresses for each hop in the strictly defined path in the segment list. This conserves resources (e.g., processing resources, network resources, memory resources, and/or the like) relative to other types of segment routing headers that would expend a significant amount of resources performing copy operations on a longer, more conventional segment routing header.

As indicated above, FIGS. 1A-1E are provided merely as one or more examples. Other examples may differ from what is described with regard to FIGS. 1A-1E.

Figure 2:
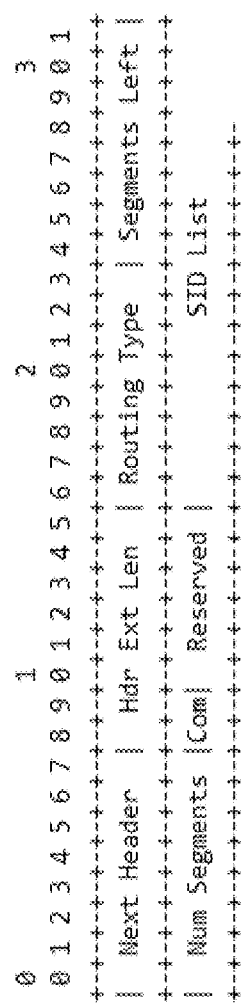
FIG. 2 is a diagram of an example CRH.

FIG. 2 is a diagram of an example CRH 200. As shown in FIG. 2, CRH 200 may include a next header field, a header extension length field, a routing type field, a remaining segments field (shown as Segments Left), a total segments field (shown as Num Segments), a reserved field, a compression field, and a list of SIDs field. The next header field may include an eight-bit selector value that identifies a type of header immediately following an IP header (e.g., an IPv6 header). The header extension length field may include an eight-bit unsigned integer value that identifies a length of a hop-by-hop options header in eight-octet units, but that excludes the first eight octets.

The routing type field may include an eight-bit identifier value for a particular routing header variant, as may be defined by the Internet Assigned Numbers Authority (IANA). The remaining segments field may include a value that identifies a quantity of remaining segments between an origin node (e.g., a node that receives an IP payload packet) and a final-hop node (e.g., a node that is part of a final segment in a path). The total segments field may include a value that identifies a maximum quantity of segments needed for an IP payload packet to reach the final-hop node. This value may be defined by a quantity of entries in the list of SIDs. The reserved field may include a value set to zero by a sender node and ignored by a receiver node.

The compression field may include a two-bit value that may be checked to determine whether an IP payload packet is malformed. For example, the compression field may include a value that a node may process to determine a minimum CRH length, which may allow the node to determine whether the IP payload packet is malformed. The minimum CRH length is measured in eight-octet units that exclude the first eight octets. The compression field may, e.g., include a value of zero, one, two, or three. The value of zero may correspond to an eight-bit encoding, the value of one may correspond to a 16-bit encoding, the value of two may correspond to a 32-bit encoding, and the value of three may correspond to a 64-bit encoding. Additionally, if the compression value is set to a value of two or a value of three, the list of SIDs begins on a 32-bit boundary. In those cases, the reserved field may be extended. In all cases, the CRH ends on a 64-bit boundary. Therefore, the CRH may be padded with zeroes.

As an example, to compute the minimum CRH length, a node may provide a compression value and a total quantity of segments value as input to an algorithm that computes the minimum CRH length. To provide example pseudocode, the node might execute the following: If (compression value==0), set a value x equal to a total segments value minus two, set the compression value equal to x divided by eight, and, if x divided by eight has a remainder, increment the compression value by one. If (compression value==1), set x equal to a total segments value minus one, set the compression value equal to x divided by four, and, if x divided by four has a remainder, increment the compression value by one. If (compression value==2), set x equal to the total quantity of segments, set the compression value equal to x divided by two, and, if x divided by two has a remainder, increment the compression value by one. If (compression value==3), set the compression value equal to the total segments value.

The list of SIDs field may include a set of SID values that represent segments in the list of segments. In some implementations, such as when the list of segments includes loosely routed segments, each SID may include a unique value. In some implementations, such as when the list of segments includes strictly routed segments, each SID may be unique to a node, such that the same SID value could be used on multiple nodes.

As indicated above, FIG. 2 is provided by way of example. Other examples may differ from what is described with regard to FIG. 2. For example, there may be additional fields and/or values, fewer fields and/or values, different fields and/or values, or differently arranged fields and/or values than those shown in FIG. 2.

FIGS. 3A-3D are diagrams of example TLV elements 300. TLV elements 300 may include a CRH capability TLV element 310, a loosely routed segment TLV element 320, a strictly routed segment TLV element 330, and a strictly routed segment TLV element for LANs 340. TLV elements 300 may be sub-TLV elements associated with a parent TLV element, as described above. TLV elements 300 may include a type field and a length field. The type field may include an eight-bit value that identifies a particular type of the TLV element (e.g., a value that identifies the TLV element as a CRH capability TLV element, a loosely routed segment TLV element, a strictly routed segment TLV element, or a strictly routed segment TLV element for LANs) as may be defined by IANA. The length field may include an eight-bit value that identifies a length of data of the TLV element excluding a header of the TLV element.

Figure 3A:

As shown in FIG. 3A, TLV elements 300 may include a CRH capability TLV element 310. In addition to a type field and a length field, CRH capability TLV element 310 may include a maximum CRH length supported field (shown as Max CRH Len) and a reserved field. The maximum CRH length supported field may identify a maximum CRH length supported by a sender node that transmitted a network topology message that included a CRH capability TLV element 310. The maximum CRH length supported field may include an eight-octet value that identifies a CRH length supported in eight-octet units, but that excludes the first eight octets. The reserved field may include a value set to zero by a sender node and ignored by a receiver node.

Figure 3B:
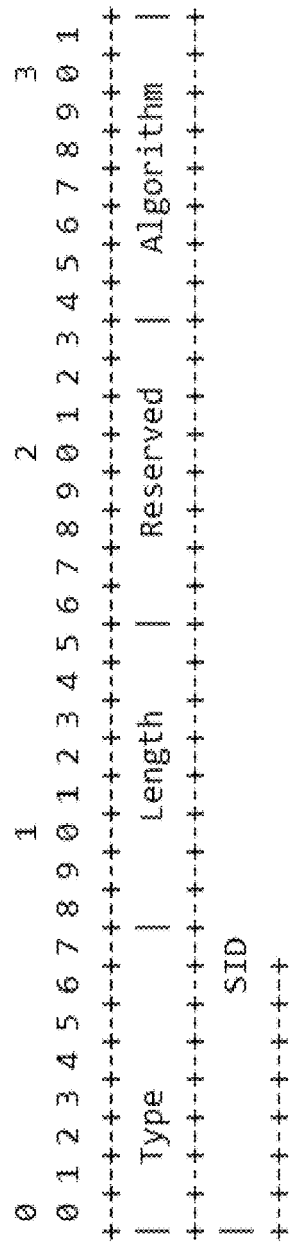

As shown in FIG. 3B, a TLV element 300 may include a loosely routed segment TLV element 320. In addition to a type field and a length field, loosely routed segment TLV element 320 may include a reserved field, an algorithm field, and a SID field. The reserved field may include a value set to zero by a sender node and ignored by a receiver node. The algorithm field may include an eight-bit value that identifies algorithms used by the sender node when calculating reachability to other nodes. For example, the value may identify a shortest path first algorithm, a strict shortest path first algorithm, and/or the like. The SID field may include a variable length value (e.g., from eight bits to 64 bits) that identifies a SID (e.g., a SID associated with an IP address identified in a parent TLV element to loosely routed segment TLV element 320), as described herein.

Figure 3C:
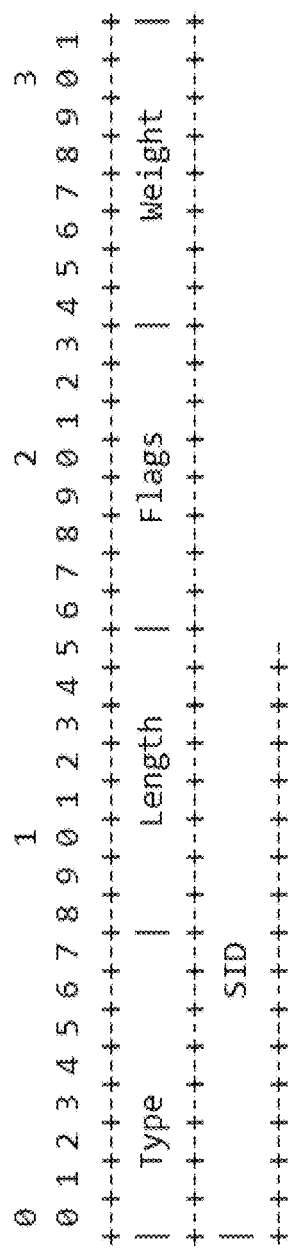

As shown in FIG. 3C, a TLV element 300 may include a strictly routed segment TLV element 330. In addition to a type field and a length field, strictly routed segment TLV element 330 may include a flags field, a weight field, and a SID field. The flags field may include an eight-bit value that identifies a type of flag applicable to a SID (e.g., mapped to the SID in a segment translation table). The type of flag may be a backup flag, a set flag, and/or a persistent flag. The backup flag may indicate that a backup segment between nodes is to be used (or is not to be used) if a segment between the nodes identified by the SID is down. The set flag may indicate that the SID refers (or does not refer) to a set of adjacencies and therefore may be assigned to other adjacencies. The persistent flag may indicate that the SID is persistently assigned to a particular segment (e.g., the SID for a segment would not change when an associated node is restarted, or the like). The weight field may include an eight-bit value that identifies a load balancing weight assigned to a segment associated with the SID. The SID field may include a variable length value (e.g., from eight bits to 64 bits) that identifies a SID (e.g., a SID associated with an IP address identified in a sibling TLV element to strictly routed segment TLV element 330), as described herein.

As shown in FIG. 3D, a TLV element 300 may include a strictly routed segment TLV element for LANs 340. In addition to a type field and a length field, strictly routed segment TLV element for LANs 340 may include a flags field, a weight field, a neighbor system identifier field (shown as Neighbor System-ID), and a SID field. The flags field and the weight field may be similar to those described in connection with strictly routed segment TLV element 330. The neighbor system identifier field may include a six-bytes value that identifies an IS-IS system. The SID field may include a variable length value (e.g., from eight bits to 64 bits) that identifies a SID (e.g., a SID associated with an IP address identified in a sibling TLV element to strictly routed segment TLV element for LANs 340), as described herein.

As indicated above, FIGS. 3A-3D are provided by way of example. Other examples may differ from what is described with regard to FIGS. 3A-3D. For example, there may be additional fields and/or values, fewer fields and/or values, different fields and/or values, or differently arranged fields and/or values than those shown in FIGS. 3A-3D.

Figure 4:
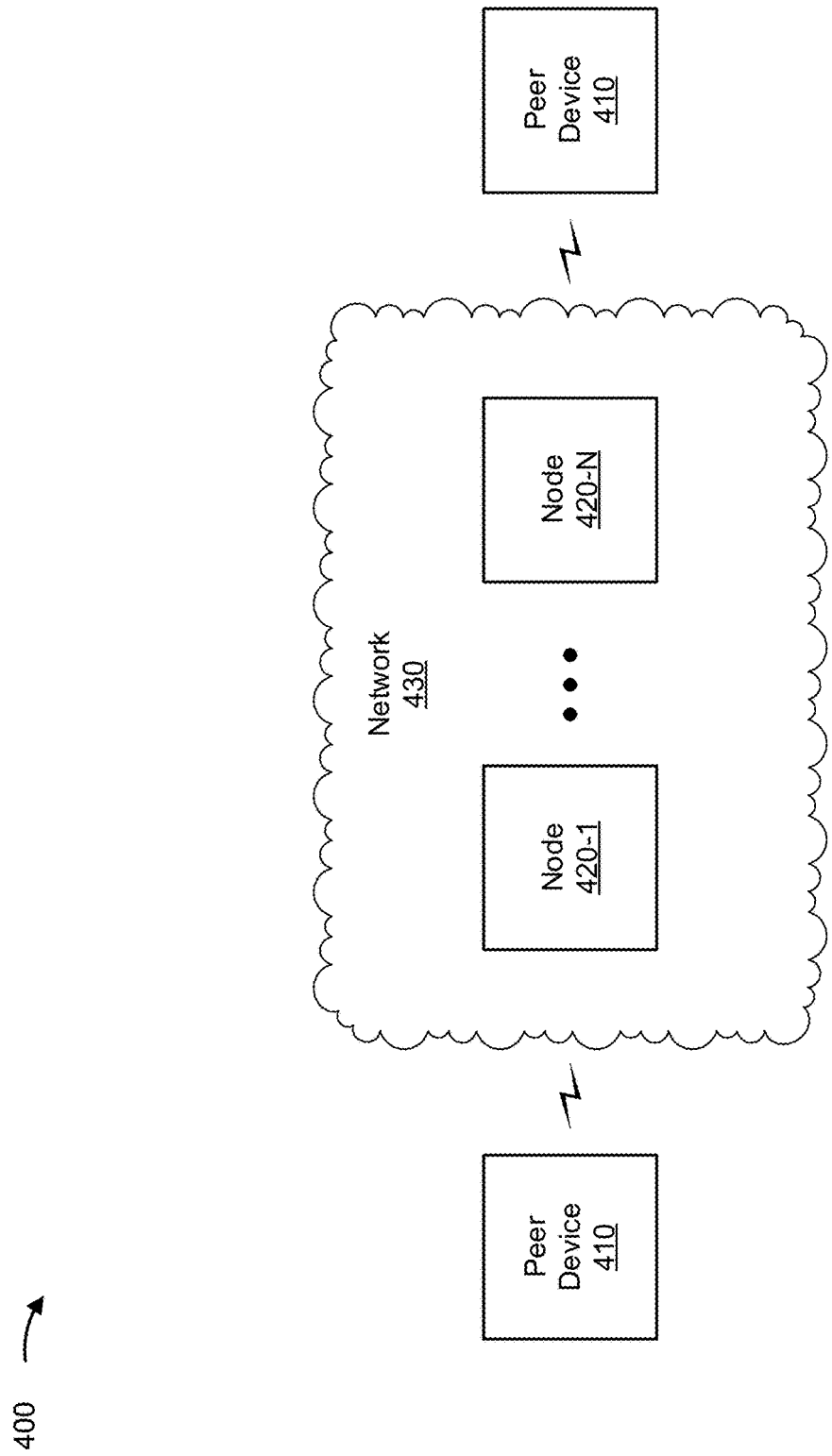
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include one or more peer devices 410, a group of nodes 420 (shown as node 420-1 through node 420-N), and a network 430. Devices of environment 400 may interconnect via wired connections, wireless connections, or a combination of wired and wireless connections.

Peer device 410 includes one or more devices capable of receiving and/or providing network traffic. For example, peer device 410 may include a traffic transfer device, such as a router, a gateway, a switch, a firewall, a hub, a bridge, a reverse proxy, a server (e.g., a proxy server, a server executing a virtual machine, and/or the like), a security device, an intrusion detection device, a load balancer, or a similar type of device. In some implementations, peer device 410 may include an endpoint device that is a source or a destination for network traffic. For example, peer device 410 may include a computer or a similar type of device. Peer device 410 may receive network traffic from and/or may provide network traffic (e.g., payload packets) to other peer devices 410 via network 430 (e.g., by routing payload packets using node(s) 420 as an intermediary). In some implementations, peer device 410 may include an edge device that is located at an edge of one or more networks. For example, peer device 410 may receive network traffic from and/or may provide network traffic (e.g., payload packets) to devices external to network 430.

Node 420 includes one or more devices capable of receiving, processing, storing, routing, and/or providing traffic (e.g., a payload packet, a file, and/or the like) in a manner described herein. For example, node 420 may include a router, such as a label switching router (LSR), a label edge router (LER), an ingress router, an egress router, a provider router (e.g., a provider edge router, a provider core router, and/or the like), a virtual router, and/or the like. Additionally, or alternatively, node 420 may include a gateway, a switch, a firewall, a hub, a bridge, a reverse proxy, a server (e.g., a proxy server, a cloud server, a data center server, and/or the like), a load balancer, and/or a similar device.

In some implementations, node 420 may be a physical device implemented within a housing, such as a chassis. In some implementations, node 420 may be a virtual device implemented by one or more computer devices of a cloud computing environment or a data center.

In some implementations, node 420 may be configured with one or more segment translation tables. In some implementations, node 420 may receive a payload packet from peer device 410. In some implementations, node 420 may encapsulate the payload packet using a compressed routing header (CRH) and may route the IP payload packet to another node 420, using one or more techniques described elsewhere herein. In some implementations, node 420 may be an edge node in network 430. In some implementations, node 420 may be an intermediary node in network 430 (i.e., a node between two or more edge nodes).

Network 430 includes one or more wired and/or wireless networks. For example, network 430 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The quantity and arrangement of devices and networks shown in FIG. 4 are provided as one or more examples. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
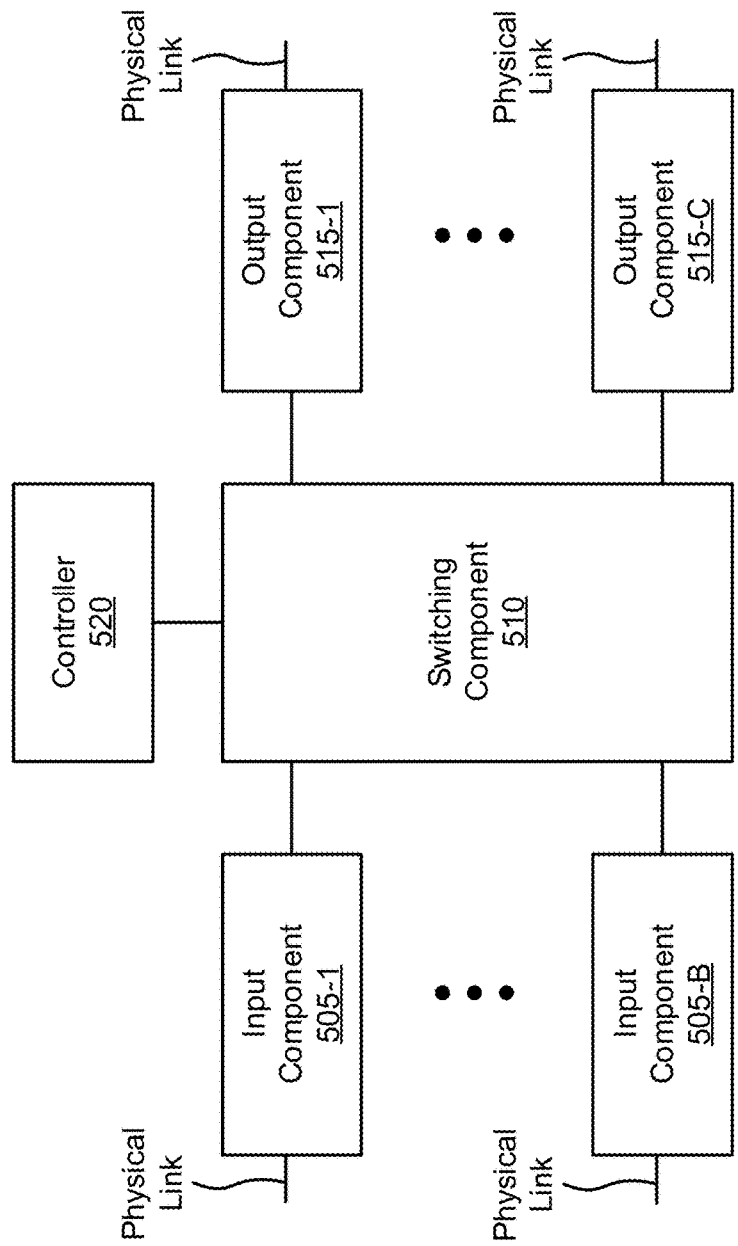
FIG. 5 is a diagram of example components of one or more devices of FIG. 4.

FIG. 5 is a diagram of example components of a device 500. Device 500 may correspond to peer device 410 and/or node 420. In some implementations, peer device 410 and/or node 420 may include one or more devices 500 and/or one or more components of device 500. As shown in FIG. 5, device 500 may include one or more input components 505-1 through 505-B (B≥1) (hereinafter referred to collectively as input components 505, and individually as input component 505), a switching component 510, one or more output components 515-1 through 515-C (C≥1) (hereinafter referred to collectively as output components 515, and individually as output component 515), and a controller 520.

Input components 505 may be points of attachment for physical links and may be points of entry for incoming traffic, such as payload packets. Input component 505 may process incoming traffic, such as by performing data link layer encapsulation or decapsulation. In some implementations, input component 505 may send and/or receive payload packets. In some implementations, input component 505 may include an input line card that includes one or more payload packet processing components (e.g., in the form of integrated circuits), such as one or more interface cards (IFCs), payload packet forwarding components, line card controller components, input ports, processors, memories, and/or input queues. In some implementations, device 500 may include one or more input components 505.

Switching component 510 may interconnect input components 505 with output components 515. In some implementations, switching component 510 may be implemented via one or more crossbars, via busses, and/or with shared memories. The shared memories may act as temporary buffers to store payload packets from input components 505 before the payload packets are eventually scheduled for delivery to output components 515. In some implementations, switching component 510 may enable input components 505, output components 515, and/or controller 520 to communicate.

Output component 515 may store payload packets and may schedule payload packets for transmission on output physical links. Output component 515 may support data link layer encapsulation or decapsulation, and/or a variety of higher-level protocols. In some implementations, output component 515 may send payload packets and/or receive payload packets. In some implementations, output component 515 may include an output line card that includes one or more payload packet processing components (e.g., in the form of integrated circuits), such as one or more IFCs, payload packet forwarding components, line card controller components, output ports, processors, memories, and/or output queues. In some implementations, device 500 may include one or more output components 515. In some implementations, input component 505 and output component 515 may be implemented by the same set of components (e.g., and input/output component may be a combination of input component 505 and output component 515).

Controller 520 includes a processor, such as a central processing unit (CPU), a graphics processing unit (GPU), an accelerated processing unit (APU), a microprocessor, a microcontroller, a digital signal processor (DSP), a field-programmable gate array (FPGA), an ASIC, and/or another type of processor or processing component. The processor is implemented in hardware, firmware, or a combination of software and hardware. In some implementations, controller 520 may include one or more processors that can be programmed to perform a function.

In some implementations, controller 520 may include a random access memory (RAM), a read only memory (ROM), and/or another type of dynamic or static storage device (e.g., a flash memory, a magnetic memory, an optical memory, and/or the like) that stores information and/or instructions for use by controller 520.

In some implementations, controller 520 may communicate with other devices, networks, and/or systems connected to device 500 to exchange information regarding network topology. Controller 520 may create translation tables based on the network topology information, create forwarding tables based on the translation tables, and forward the forwarding tables to input components 505 and/or output components 515. Input components 505 and/or output components 515 may use the forwarding tables to perform route lookups for incoming and/or outgoing payload packets. In some cases, controller 520 may create a session table based on information determined while initializing a link fault detection session, and may forward the session table to input components 505 and/or output components 515.

Controller 520 may perform one or more processes described herein. Controller 520 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 520 from another computer-readable medium or from another device via a communication interface. When executed, software instructions stored in a memory and/or storage component associated with controller 520 may cause controller 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The quantity and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
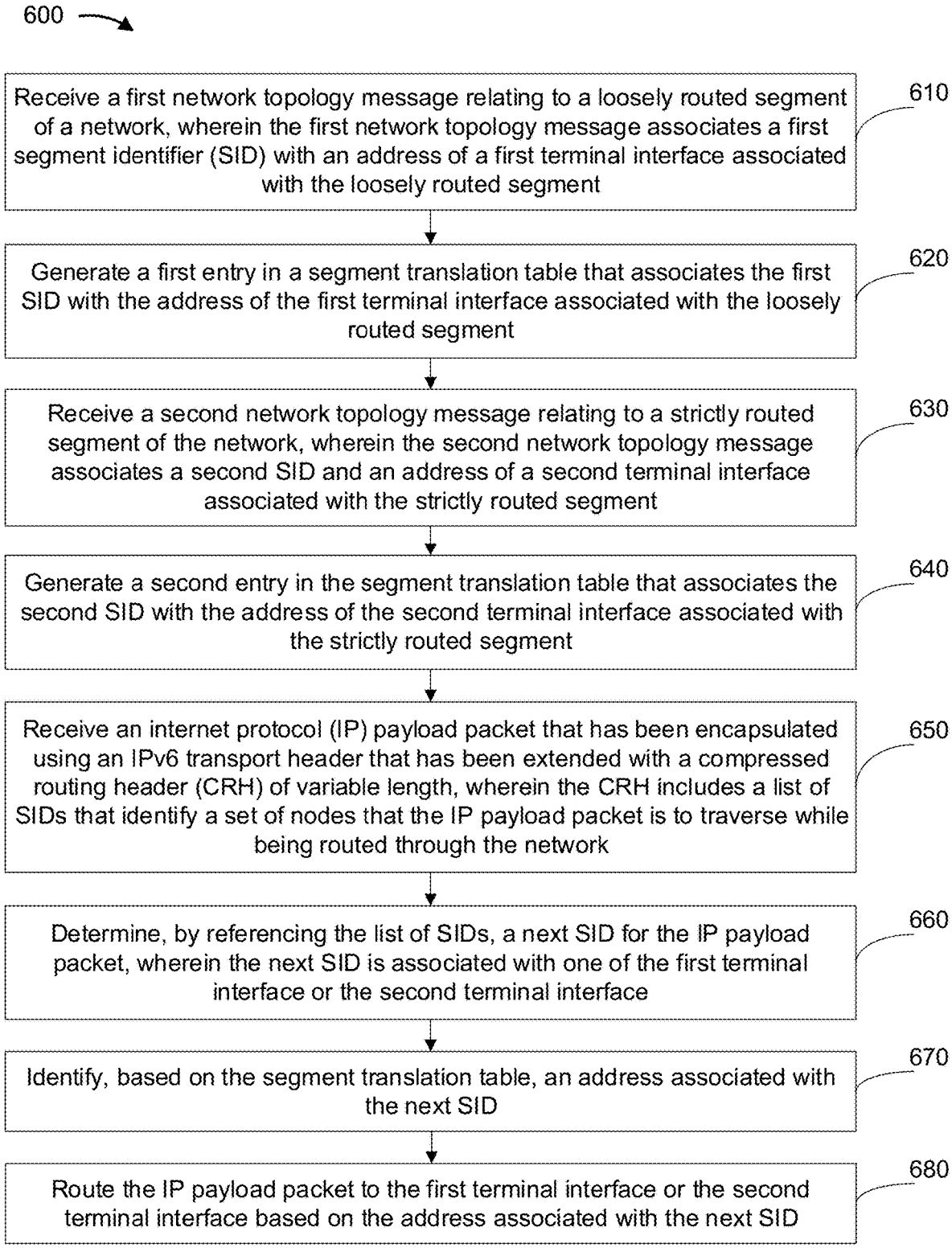
FIGS. 6-8 are flowcharts of example processes for routing a payload packet through a network using a transport header that has been extended with a CRH.

FIG. 6 is a flowchart of an example process 600 for routing a payload packet through a network using a transport header that has been extended with a CRH. In some implementations, one or more process blocks of FIG. 6 may be performed by a node (e.g., node 420). In some implementations, one or more process blocks of FIG. 6 may be performed by another device or a group of devices separate from or including the node, such as a peer device (e.g., peer device 410), or the like.

As shown in FIG. 6, process 600 may include receiving a first network topology message relating to a loosely routed segment of a network, wherein the first network topology message associates a first SID with an address of a first terminal interface associated with the loosely routed segment (block 610). For example, the node (e.g., using input component 505, switching component 510, controller 520, and/or the like) may receive a first network topology message relating to a loosely routed segment of a network, as described above. In some implementations, the first network topology message associates a first SID with an address of a first terminal interface associated with the loosely routed segment.

As further shown in FIG. 6, process 600 may include generating a first entry in a segment translation table that associates the first SID with the address of the first terminal interface associated with the loosely routed segment (block 620). For example, the node (e.g., using switching component 510, controller 520, and/or the like) may generate a first entry in a segment translation table that associates the first SID with the address of the first terminal interface associated with the loosely routed segment, as described above.

As further shown in FIG. 6, process 600 may include receiving a second network topology message relating to a strictly routed segment of the network, wherein the second network topology message associates a second SID and an address of a second terminal interface associated with the strictly routed segment (block 630). For example, the node (e.g., using input component 505, switching component 510, controller 520, and/or the like) may receive a second network topology message relating to a strictly routed segment of the network, as described above. In some implementations, the second network topology message associates a second SID and an address of a second terminal interface associated with the strictly routed segment.

As further shown in FIG. 6, process 600 may include generating a second entry in the segment translation table that associates the second SID with the address of the second terminal interface associated with the strictly routed segment (block 640). For example, the node (e.g., using switching component 510, controller 520, and/or the like) may generate a second entry in the segment translation table that associates the second SID with the address of the second terminal interface associated with the strictly routed segment, as described above.

As further shown in FIG. 6, process 600 may include receiving an IP payload packet that has been encapsulated using an IPv6 transport header that has been extended with a CRH of variable length, wherein the CRH includes a list of SIDs that identify a set of nodes that the IP payload packet is to traverse while being routed through the network (block 650). For example, the node (e.g., using input component 505, switching component 510, controller 520, and/or the like) may receive an IP payload packet that has been encapsulated using an IPv6 transport header that has been extended with a CRH of variable length, as described above. In some implementations, the CRH includes a list of SIDs that identify a set of nodes that the IP payload packet is to traverse while being routed through the network.

As further shown in FIG. 6, process 600 may include determining, by referencing the list of SIDs, a next SID for the IP payload packet wherein the next SID is associated with one of the first terminal interface or the second terminal interface (block 660). For example, the node (e.g., using switching component 510, controller 520, and/or the like) may determine, by referencing the list of SIDs, a next SID for the IP payload, as described above. In some implementations, the next SID is associated with one of the first terminal interface or the second terminal interface.

As further shown in FIG. 6, process 600 may include identifying, based on the segment translation table, an address associated with the next SID (block 670). For example, the node (e.g., using switching component 510, controller 520, and/or the like) may identify, based on the segment translation table, an address associated with the next SID, as described above.

As further shown in FIG. 6, process 600 may include routing the IP payload packet to the first terminal interface or the second terminal interface based on the address associated with the next SID (block 680). For example, the node (e.g., using switching component 510, output component 515, controller 520, and/or the like) may route the IP payload packet to the first terminal interface or the second terminal interface based on the address associated with the next SID, as described above.

Process 600 may include additional implementations, such as any single implementation or any combination of implementations described below and/or in connection with one or more other processes described elsewhere herein.

In a first implementation, process 600 may further include receiving, prior to receiving the first network topology message and the second network topology message, a third network topology message relating to a CRH processing capability of another node of the network, where the other node is associated with the strictly routed segment or the loosely routed segment. In a second implementation, alone or in combination with the first implementation, the first network topology message includes a parent element and a child element, where the parent element identifies the address of the first terminal interface and the child element identifies the first SID. In a third implementation, alone or in combination with one or more of the first and second implementations, the second network topology message includes a first child element and a second child element, where the first child element identifies the address of the second terminal interface and the second child element identifies the second SID.

In a fourth implementation, alone or in combination with one or more of the first through third implementations, the second network topology message further relates to an adjacency to a designated intermediate system of a local area network. In a fifth implementation, alone or in combination with one or more of the first through fourth implementations, the second network topology message further identifies a link between the node and another node associated with the strictly routed segment, and the second entry in the segment translation table further associates the second SID with the link. In a sixth implementation, alone or in combination with one or more of the first through fifth implementations, the second network topology message further identifies whether an alternative segment may be used when the strictly routed segment is down, and the second entry in the segment translation table further associates the second SID with an indication of whether the alternative segment may be used.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
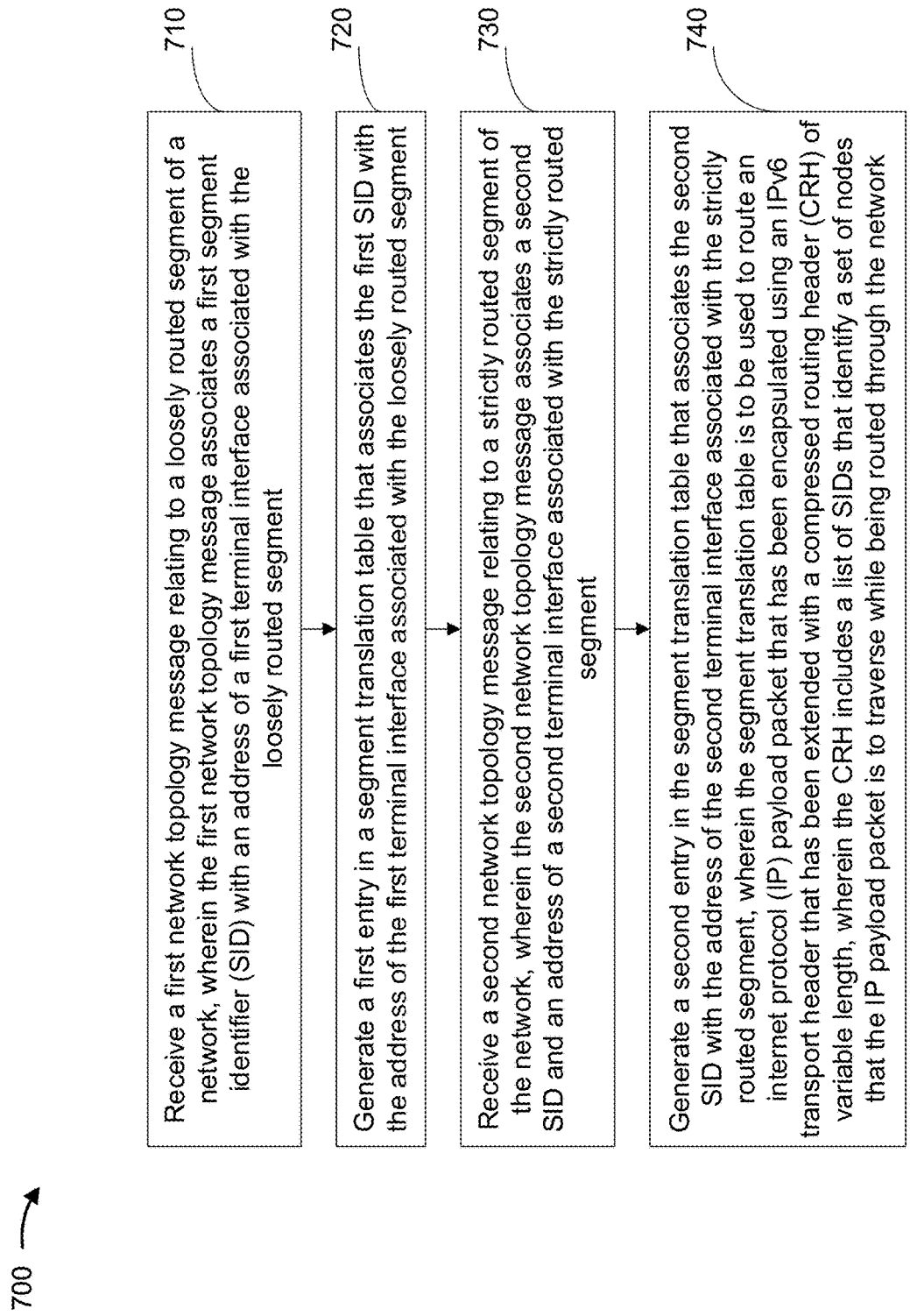

FIG. 7 is a flowchart of an example process 700 for routing a payload packet through a network using a transport header that has been extended with a CRH. In some implementations, one or more process blocks of FIG. 7 may be performed by a node (e.g., node 420). In some implementations, one or more process blocks of FIG. 7 may be performed by another device or a group of devices separate from or including the node, such as a peer device (e.g., peer device 410), or the like.

As shown in FIG. 7, process 700 may include receiving a first network topology message relating to a loosely routed segment of a network, wherein the first network topology message associates a first SID with an address of a first terminal interface associated with the loosely routed segment (block 710). For example, the node (e.g., using input component 505, switching component 510, controller 520, and/or the like) may receive a first network topology message relating to a loosely routed segment of a network, as described above. In some implementations, the first network topology message associates a first SID with an address of a first terminal interface associated with the loosely routed segment.

As further shown in FIG. 7, process 700 may include generating a first entry in a segment translation table that associates the first SID with the address of the first terminal interface associated with the loosely routed segment (block 720). For example, the node (e.g., using switching component 510, controller 520, and/or the like) may generate a first entry in a segment translation table that associates the first SID with the address of the first terminal interface associated with the loosely routed segment, as described above.

As further shown in FIG. 7, process 700 may include receiving a second network topology message relating to a strictly routed segment of the network, wherein the second network topology message associates a second SID and an address of a second terminal interface associated with the strictly routed segment (block 730). For example, the node (e.g., using input component 505, switching component 510, controller 520, and/or the like) may receive a second network topology message relating to a strictly routed segment of the network, as described above. In some implementations, the second network topology message associates a second SID and an address of a second terminal interface associated with the strictly routed segment.

As further shown in FIG. 7, process 700 may include generating a second entry in the segment translation table that associates the second SID with the address of the second terminal interface associated with the strictly routed segment, wherein the segment translation table is to be used to route an IP payload packet that has been encapsulated using an IPv6 transport header that has been extended with a CRH of variable length, and wherein the CRH includes a list of SIDs that identify a set of nodes that the IP payload packet is to traverse while being routed through the network (block 740). For example, the node (e.g., using switching component 510, controller 520, and/or the like) may generate a second entry in the segment translation table that associates the second SID with the address of the second terminal interface associated with the strictly routed segment, as described above. In some implementations, the segment translation table is to be used to route an IP payload packet that has been encapsulated using an IPv6 transport header that has been extended with a CRH of variable length. In some implementations, the CRH includes a list of SIDs that identify a set of nodes that the IP payload packet is to traverse while being routed through the network.

Process 700 may include additional implementations, such as any single implementation or any combination of implementations described below and/or in connection with one or more other processes described elsewhere herein.

In a first implementation, process 700 may further include receiving, prior to receiving the first network topology message and the second network topology message, a third network topology message relating to a CRH processing capability of another node, where the other node is associated with the strictly routed segment or the loosely routed segment, and the first entry or the second entry in the segment translation table is associated with the other node. In a second implementation, alone or in combination with the first implementation, process 700 may further include receiving, after receiving the third network topology message, a fourth network topology message relating to one or more segment routing algorithms supported by the other node, and generating a record identifying the one or more segment routing algorithms supported by the other node.

In a third implementation, alone or in combination with one or more of the first and second implementations, the second network topology message further identifies a link between the node and another node associated with the strictly routed segment, and the second entry in the segment translation table further associates the second SID with the link. In a fourth implementation, alone or in combination with one or more of the first through third implementations, the second network topology message further identifies whether the strictly routed segment is associated with a set of adjacencies, and the second entry in the segment translation table further associates the second SID with an indication of whether the strictly routed segment is associated with the set of adjacencies. In a fifth implementation, alone or in combination with one or more of the first through fourth implementations, the second network topology message further identifies a load balancing weight that is to be assigned to the strictly routed segment.

In a sixth implementation, alone or in combination with one or more of the first through fifth implementations, the first SID has a different length than the second SID.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
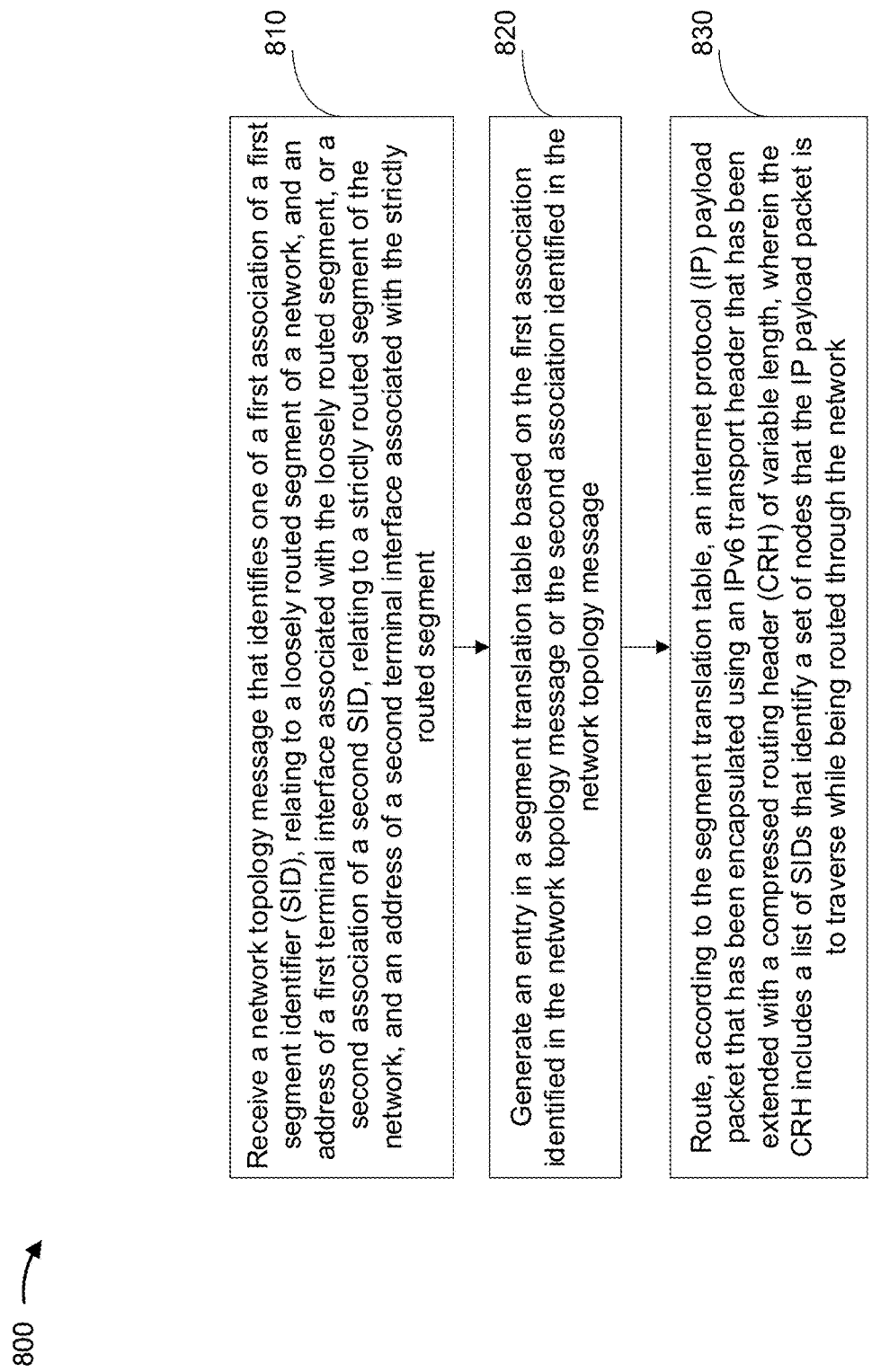

FIG. 8 is a flowchart of an example process 800 for routing a payload packet through a network using a transport header that has been extended with a CRH. In some implementations, one or more process blocks of FIG. 8 may be performed by a node (e.g., node 420). In some implementations, one or more process blocks of FIG. 8 may be performed by another device or a group of devices separate from or including the node, such as a peer device (e.g., peer device 410), or the like.

As shown in FIG. 8, process 800 may include receiving a network topology message that identifies one of a first association of a first SID, relating to a loosely routed segment of a network, and an address of a first terminal interface associated with the loosely routed segment, or a second association of a second SID, relating to a strictly routed segment of the network, and an address of a second terminal interface associated with the strictly routed segment (block 810). For example, the node (e.g., using input component 505, switching component 510, controller 520, and/or the like) may receive a network topology message that identifies one of a first association of a first SID, relating to a loosely routed segment of a network, and an address of a first terminal interface associated with the loosely routed segment, or a second association of a second SID, relating to a strictly routed segment of the network, and an address of a second terminal interface associated with the strictly routed segment, as described above.

As further shown in FIG. 8, process 800 may include generating an entry in a segment translation table based on the first association identified in the network topology message or the second association identified in the network topology message (block 820). For example, the node (e.g., using switching component 510, controller 520, and/or the like) may generate an entry in a segment translation table based on the first association identified in the network topology message or the second association identified in the network topology message, as described above.

As further shown in FIG. 8, process 800 may include routing, according to the segment translation table, an IP payload packet that has been encapsulated using an IPv6 transport header that has been extended with a CRH of variable length, wherein the CRH includes a list of SIDs that identify a set of nodes that the IP payload packet is to traverse while being routed through the network (block 830). For example, the node (e.g., using switching component 510, output component 515, controller 520, and/or the like) may route, according to the segment translation table, an IP payload packet that has been encapsulated using an IPv6 transport header that has been extended with a CRH of variable length, as described above. In some implementations, the CRH includes a list of SIDs that identify a set of nodes that the IP payload packet is to traverse while being routed through the network.

Process 800 may include additional implementations, such as any single implementation or any combination of implementations described below and/or in connection with one or more other processes described elsewhere herein.

In a first implementation, process 800 may further include receiving, prior to receiving the network topology message, an initial network topology message relating to a CRH processing capability of another node, where the other node is associated with the strictly routed segment or the loosely routed segment, and the entry in the segment translation table is associated with the other node.

In a second implementation, alone or in combination with the first implementation, the network topology message relates to a reachability of a node. In a third implementation, alone or in combination with one or more of the first and second implementations, the network topology message relates to a neighbor node of a node.

In a fourth implementation, alone or in combination with one or more of the first through third implementations, the network topology message further identifies whether the second SID is persistently assigned to the strictly routed segment, where the second association is of the second SID, the address of the second terminal interface, and an indication of whether the second SID is persistently assigned to the strictly routed segment. In a fifth implementation, alone or in combination with one or more of the first through fourth implementations, the network topology message includes one or more type-length-value elements.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a node, a first network topology message relating to a loosely routed segment of a network,
   wherein the first network topology message associates a first segment identifier (SID) with an Internet Protocol (IP) address of a first terminal interface associated with the loosely routed segment based on the first SID being identified in a first field, of the network topology message, that is associated with a second field, of the network topology message, that identifies the IP address of the first terminal interface;
   generating, by the node based on determining the IP address of the first terminal interface based on the first network topology message, a first entry in a segment translation table that associates the first SID with the IP address of the first terminal interface associated with the loosely routed segment;

receiving, by the node, a second network topology message relating to a strictly routed segment of the network,
wherein the second network topology message associates a second SID and an IP address of a second terminal interface associated with the strictly routed segment;

generating, by the node, a second entry in the segment translation table that associates the second SID with the IP address of the second terminal interface associated with the strictly routed segment,
wherein the segment translation table includes a first list of SIDs including the first SID and the second SID;

receiving, by the node, an IP payload packet that has been encapsulated using an IPv6 transport header that has been extended with a compressed routing header (CRH) of variable length,
wherein the CRH includes a second list of SIDs that identifies a set of nodes, including the node, that the IP payload packet is to traverse while being routed through the network,
wherein the second list of SIDs includes a list of node specific values corresponding to the first list of SIDs included in the segment translation table, and
wherein the CRH includes a remaining segments value of the CRH;

determining, by the node and by referencing the second list of SIDs and based on the remaining segments value, a next SID for the IP payload packet,
wherein the next SID is associated with one of the first terminal interface or the second terminal interface;

identifying, by the node and based on the segment translation table, an IP address associated with the next SID;
updating, by the node, the remaining segments value; and
routing, by the node, the IP payload packet to the first terminal interface or the second terminal interface based on the IP address associated with the next SID.

2. The method of claim 1, further comprising:
receiving, prior to receiving the first network topology message and the second network topology message, a third network topology message relating to a CRH processing capability of another node of the network,
wherein the other node is associated with the strictly routed segment or the loosely routed segment.

3. The method of claim 1, wherein the first network topology message includes a parent element and a child element,
wherein the parent element identifies the IP address of the first terminal interface and the child element identifies the first SID.

4. The method of claim 1, wherein the second network topology message includes a first child element and a second child element,
wherein the first child element identifies the IP address of the second terminal interface and the second child element identifies the second SID.

5. The method of claim 1, wherein the second network topology message further relates to an adjacency to a designated intermediate system of a local area network.

6. The method of claim 1, wherein the second network topology message further identifies a link between the node and another node associated with the strictly routed segment,
wherein the second entry in the segment translation table further associates the second SID with the link.

7. The method of claim 1, wherein the second network topology message further identifies whether an alternative segment may be used when the strictly routed segment is down,
wherein the second entry in the segment translation table further associates the second SID with an indication of whether the alternative segment may be used.

8. A node, comprising:
one or more memories; and
one or more processors communicatively coupled to the one or more memories, to:
receive a first network topology message relating to a loosely routed segment of a network,
wherein the first network topology message associates a first segment identifier (SID) with an Internet Protocol (IP) address of a first terminal interface associated with the loosely routed segment based on the first SID being identified in a first field, of the first network topology message, that is associated with a second field, of the first network topology message, that identifies the IP address of the first terminal interface;
generate, based on determining the IP address of the first terminal interface based on the first network topology message, a first entry in a segment translation table that associates the first SID with the IP address of the first terminal interface associated with the loosely routed segment;
receive a second network topology message relating to a strictly routed segment of the network,
wherein the second network topology message associates a second SID and an IP address of a second terminal interface associated with the strictly routed segment;
generate a second entry in the segment translation table that associates the second SID with the IP address of the second terminal interface associated with the strictly routed segment,
wherein the segment translation table includes a first list of SIDs including the first SID and the second SID, and
wherein the segment translation table is to be used to route an IP payload packet that has been encapsulated using an IPv6 transport header that has been extended with a compressed routing header (CRH) of variable length,
wherein the CRH includes a second list of SIDs that identifies a set of nodes, including the node, that the IP payload packet is to traverse while being routed through the network,
wherein the second list of SIDs includes a list of node specific values corresponding to the first list of SIDs included in the segment translation table, and
wherein the one or more processors are configured to generate the second entry in the segment translation table based on a remaining segments value of the CRH; and
update the remaining segments value.

9. The node of claim 8, wherein the one or more processors are further to:

receive, prior to receiving the first network topology message and the second network topology message, a third network topology message relating to a CRH processing capability of another node,
> wherein the other node is associated with the strictly routed segment or the loosely routed segment,
>> wherein the first entry or the second entry in the segment translation table is associated with the other node.

10. The node of claim 9, wherein the one or more processors are further to:
receive, after receiving the third network topology message, a fourth network topology message relating to one or more segment routing algorithms supported by the other node; and
generate a record identifying the one or more segment routing algorithms supported by the other node.

11. The node of claim 8, wherein the second network topology message further identifies a link between the node and another node associated with the strictly routed segment,
> wherein the second entry in the segment translation table further associates the second SID with the link.

12. The node of claim 8, wherein the second network topology message further identifies whether the strictly routed segment is associated with a set of adjacencies,
> wherein the second entry in the segment translation table further associates the second SID with an indication of whether the strictly routed segment is associated with the set of adjacencies.

13. The node of claim 8, wherein the second network topology message further identifies a load balancing weight that is to be assigned to the strictly routed segment.

14. The node of claim 8, wherein the first SID has a different length than the second SID.

15. A non-transitory computer-readable medium storing instructions, the instructions comprising:
one or more instructions that, when executed by one or more processors, cause the one or more processors to:
> receive a network topology message that identifies one of:
>> a first association of a first segment identifier (SID), relating to a loosely routed segment of a network, and an Internet Protocol (IP) address of a first terminal interface associated with the loosely routed segment based on the first SID being identified in a first field, of the network topology message, that is associated with a second field, of the network topology message, that identifies the IP address of the first terminal interface, or
>> a second association of a second SID, relating to a strictly routed segment of the network, and an IP address of a second terminal interface associated with the strictly routed segment;
> generate, based on determining the IP address of the first terminal interface based on the network topology message, an entry in a segment translation table based on the first association identified in the network topology message or the second association identified in the network topology message and based on a remaining segments value of a compressed routing header (CRH) of variable length,
>> wherein the segment translation table includes a first list of SIDs including the first SID and the second SID, and
>> wherein the one or more instructions, that cause the one or more processors to generate the entry in the segment translation table, cause the one or more processors to determine, based on the network topology message, the IP address of the first terminal interface or the second terminal interface;
> update the remaining segments value; and
> route, according to the segment translation table, an IP payload packet that has been encapsulated using an IPv6 transport header that has been extended with the CRH,
>> wherein the CRH includes a second list of SIDs that identifies a set of nodes, including the node, that the IP payload packet is to traverse while being routed through the network,
>>> wherein the second list of SIDs includes a list of node specific values corresponding to the first list of SIDs included in the segment translation table.

16. The non-transitory computer-readable medium of claim 15, wherein the one or more instructions, when executed by the one or more processors, further cause the one or more processors to:
receive, prior to receiving the network topology message, an initial network topology message relating to a CRH processing capability of another node,
> wherein the other node is associated with the strictly routed segment or the loosely routed segment,
>> wherein the entry in the segment translation table is associated with the other node.

17. The non-transitory computer-readable medium of claim 15, wherein the network topology message relates to a reachability of a node of the set of nodes.

18. The non-transitory computer-readable medium of claim 15, wherein the network topology message relates to a neighbor node of a node of the set of nodes.

19. The non-transitory computer-readable medium of claim 15, wherein the network topology message further identifies whether the second SID is persistently assigned to the strictly routed segment,
wherein the second association is of the second SID, the IP address of the second terminal interface, and an indication of whether the second SID is persistently assigned to the strictly routed segment.

20. The non-transitory computer-readable medium of claim 15, wherein the network topology message includes one or more type-length-value elements.

* * * * *